US011551467B2

(12) United States Patent
Song et al.

(10) Patent No.: US 11,551,467 B2
(45) Date of Patent: Jan. 10, 2023

(54) METHOD OF OBTAINING REFERENCE IMAGE FOR OPTICAL OBJECT RECOGNITION AND METHOD OF PERFORMING OPTICAL OBJECT RECOGNITION USING THE SAME

(71) Applicant: Samsung Electronics Co., Ltd., Suwon-si (KR)

(72) Inventors: Moonkyu Song, Seoul (KR); Seongwook Song, Seoul (KR); Taeui Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 45 days.

(21) Appl. No.: 17/145,544

(22) Filed: Jan. 11, 2021

(65) Prior Publication Data

US 2021/0334501 A1    Oct. 28, 2021

(30) Foreign Application Priority Data

Apr. 27, 2020  (KR) .................. 10-2020-0050646

(51) Int. Cl.
  *G06K 9/00*    (2022.01)
  *G06V 40/12*    (2022.01)
  (Continued)

(52) U.S. Cl.
  CPC ...... *G06V 40/1318* (2022.01); *G06V 40/1394* (2022.01); *G16Y 20/20* (2020.01); *G16Y 40/10* (2020.01)

(58) Field of Classification Search
  CPC ........... G06V 40/1318; G06V 40/1394; G06V 40/12; G16Y 20/20
  See application file for complete search history.

(56) References Cited

U.S. PATENT DOCUMENTS 19,749 A     3/1858  Chenoweth
8,605,960 B2  12/2013  Orsley
(Continued)

FOREIGN PATENT DOCUMENTS

KR        20180005588 A    1/2018
KR         101924916 B1   12/2018
(Continued)

*Primary Examiner* — Lixi C Simpson
(74) *Attorney, Agent, or Firm* — Harness, Dickey & Pierce, P.L.C.

(57) ABSTRACT

Various example embodiments are directed towards systems, apparatuses, and/or methods of obtaining a reference image for optical object recognition, the method including driving a subset of light sources of a plurality of light sources, receiving, using an object recognition sensor, light reflected off a first target object, obtaining a first reference image based on the reflected light, obtaining a first target image associated with the first target object based on the reflected light, obtaining at least one first environment information using at least one environmental sensor while driving the subset of light sources, the first environment information associated with a surrounding environment, storing the first reference image and the first environment information together, and obtaining a first effective image for the first target object based on the first target image and the first reference image.

20 Claims, 25 Drawing Sheets

(51) Int. Cl.
  *G06V 40/13* (2022.01)
  *G16Y 20/20* (2020.01)
  *G16Y 40/10* (2020.01)

(56) References Cited

U.S. PATENT DOCUMENTS

| | | |
|---|---|---|
| 9,274,553 B2 | 3/2016 | Erhart et al. |
| 9,336,428 B2 | 5/2016 | Erhart |
| 9,589,170 B2 | 3/2017 | Ling |
| 9,704,013 B2 | 7/2017 | Nelson |
| 9,934,418 B2 | 4/2018 | Mienko et al. |
| 10,410,033 B2 | 9/2019 | He et al. |
| 10,410,036 B2 | 9/2019 | He et al. |
| 10,410,037 B2 | 9/2019 | He et al. |
| 10,437,974 B2 | 10/2019 | He et al. |
| 10,438,046 B2 | 10/2019 | He et al. |
| 10,614,279 B2 | 4/2020 | Kim et al. |
| 10,614,283 B2 | 4/2020 | He et al. |
| 10,635,878 B2 | 4/2020 | He et al. |
| 11,093,776 B2 * | 8/2021 | Jung ............... G06V 40/1376 |
| 2017/0076132 A1 * | 3/2017 | Sezan ............... G06F 21/32 |
| 2018/0012069 A1 | 1/2018 | Chung et al. |
| 2018/0046281 A1 | 2/2018 | Pi et al. |
| 2018/0348949 A1 | 12/2018 | Kim et al. |
| 2018/0349669 A1 | 12/2018 | Kim et al. |
| 2019/0050620 A1 * | 2/2019 | Andersson ......... G06V 40/1318 |
| 2019/0102597 A1 * | 4/2019 | Lu ............... G06V 40/1318 |
| 2019/0362119 A1 | 11/2019 | He et al. |
| 2019/0377858 A1 | 12/2019 | He et al. |
| 2020/0019749 A1 | 1/2020 | He et al. |
| 2020/0175142 A1 * | 6/2020 | Chiang ............... G06V 10/30 |
| 2021/0174105 A1 * | 6/2021 | He ............... G06V 40/1318 |
| 2021/0264575 A1 * | 8/2021 | Zhang ............... G06V 40/1347 |
| 2021/0326567 A1 * | 10/2021 | Liu ............... G06V 40/1347 |

FOREIGN PATENT DOCUMENTS

| | | | | |
|---|---|---|---|---|
| KR | 20180132496 A | 12/2018 | | |
| WO | WO-2018128422 A1 * | 7/2018 | ......... | G06K 9/00013 |

* cited by examiner

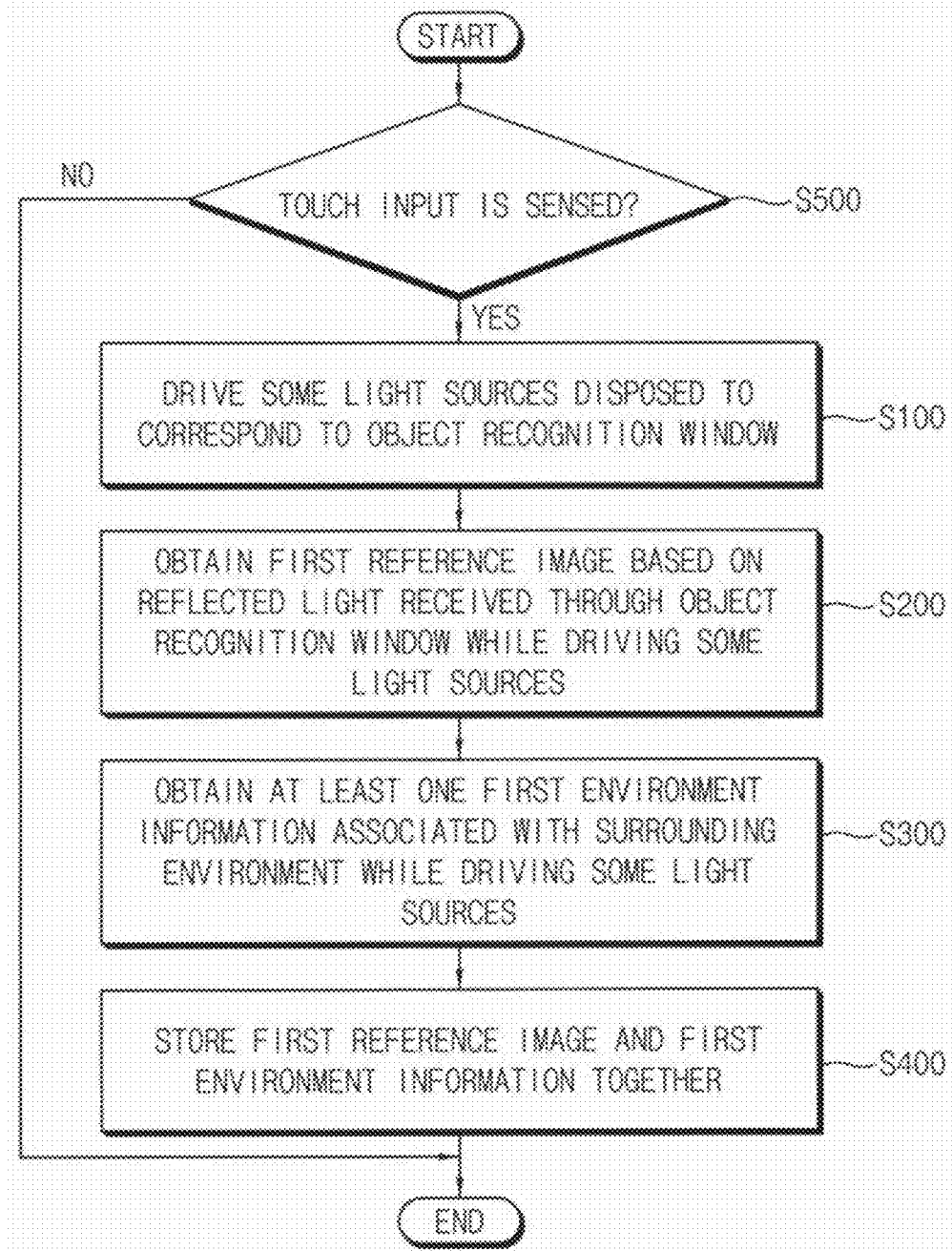

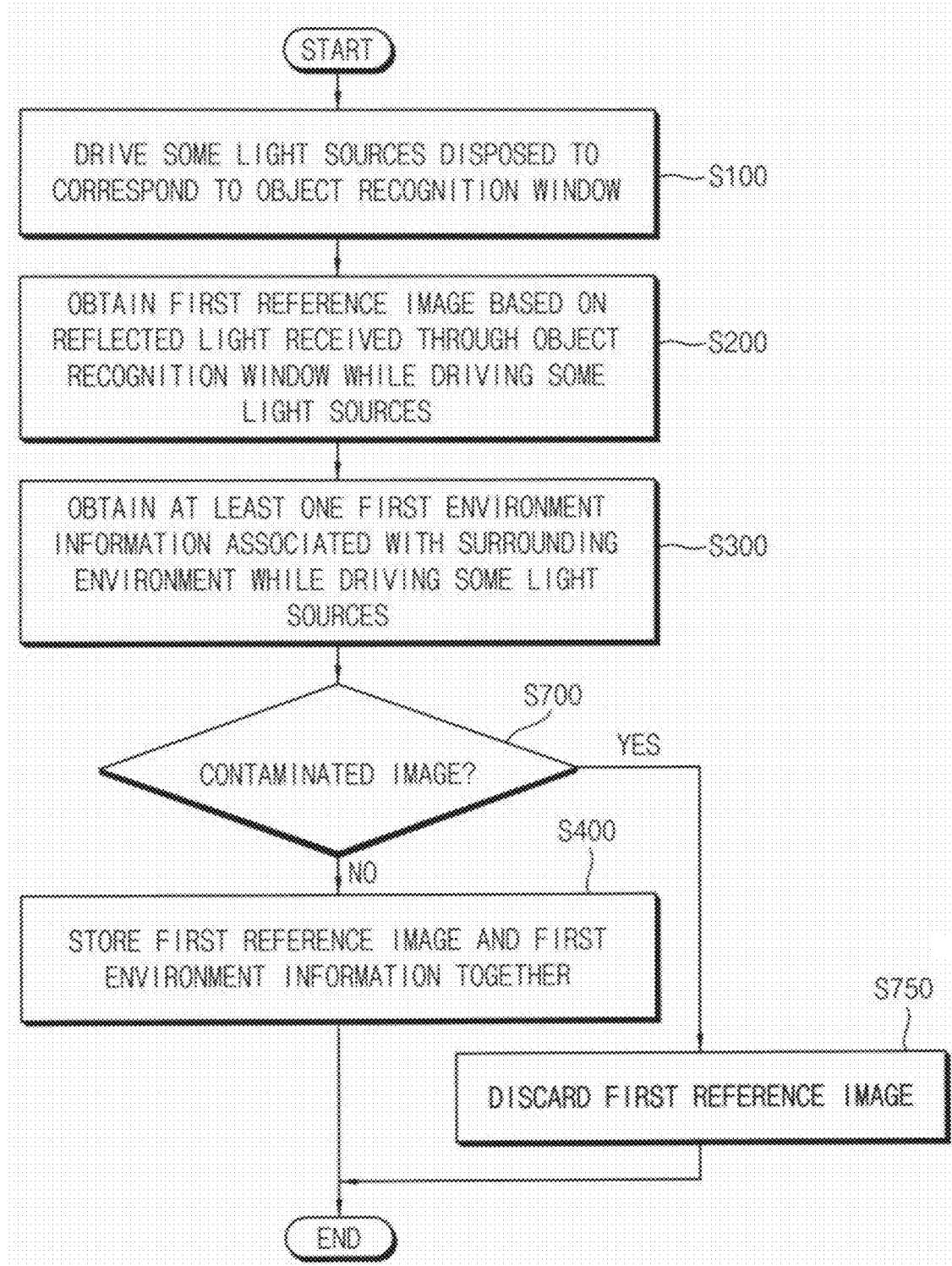

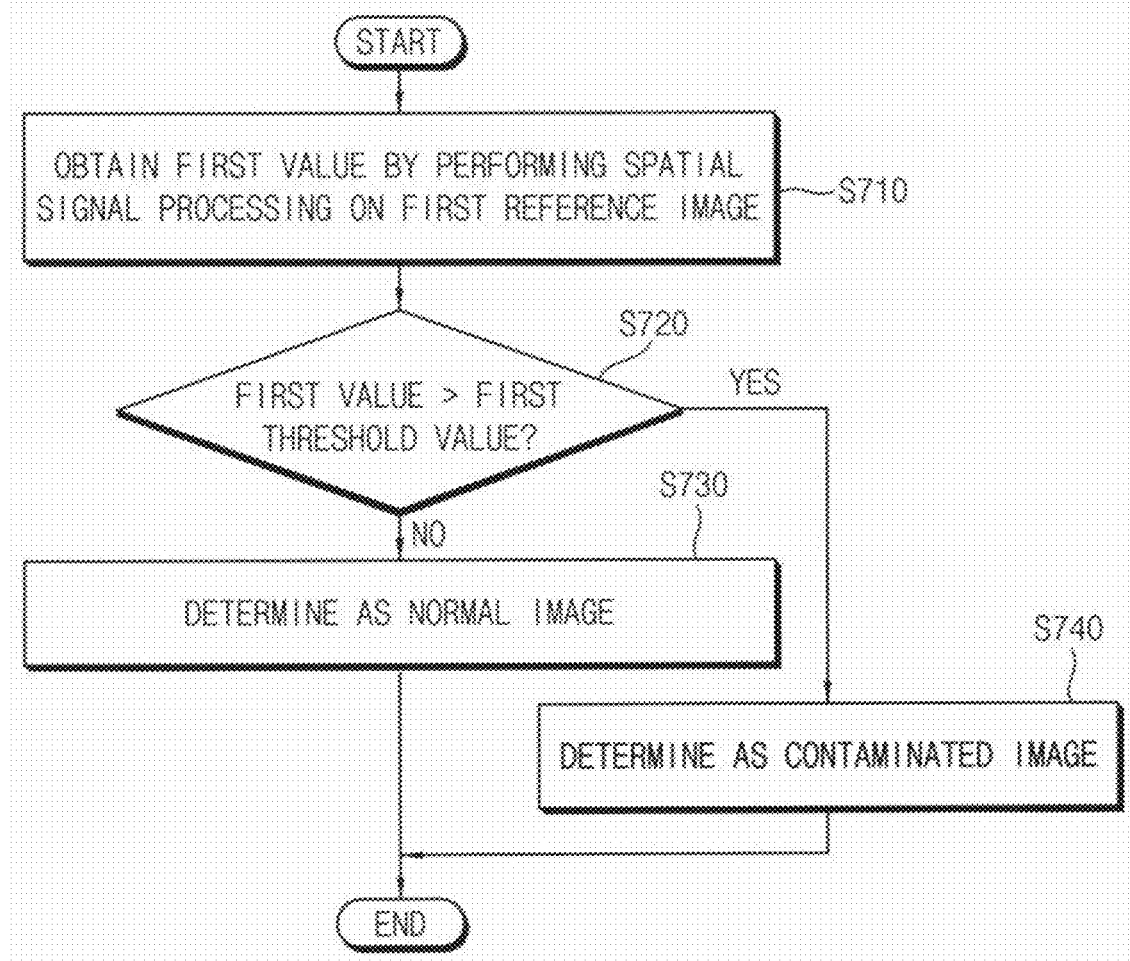

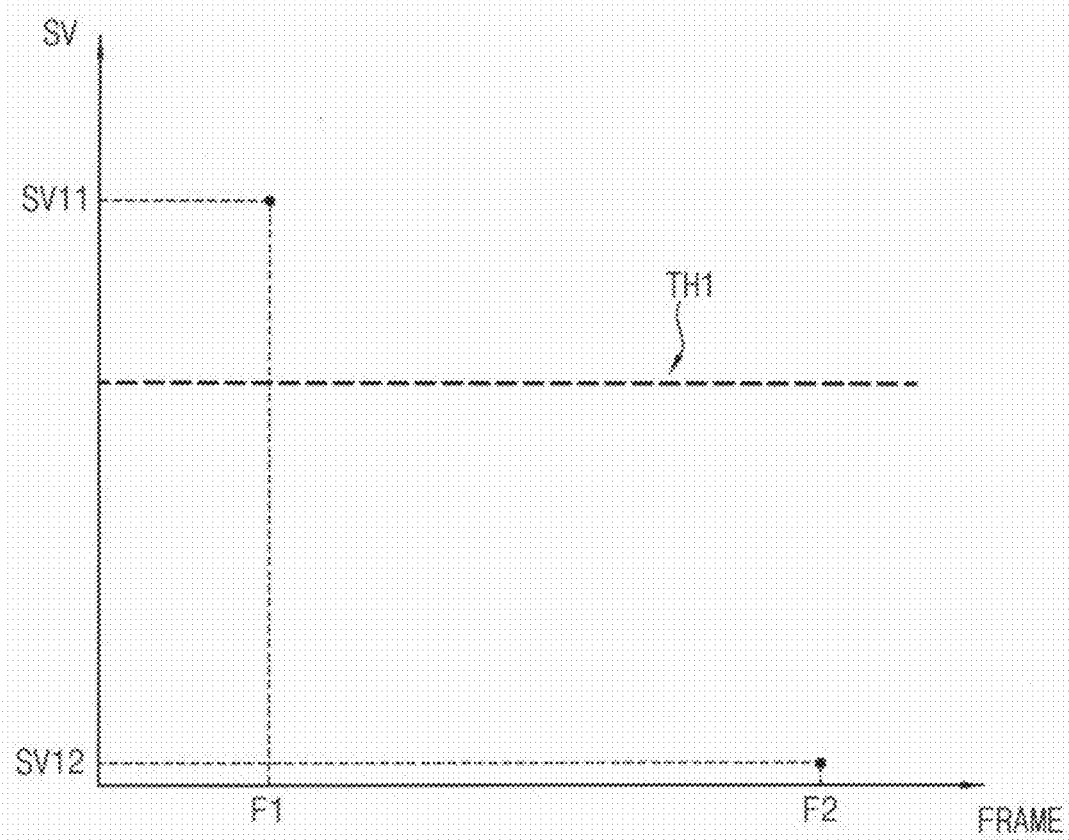

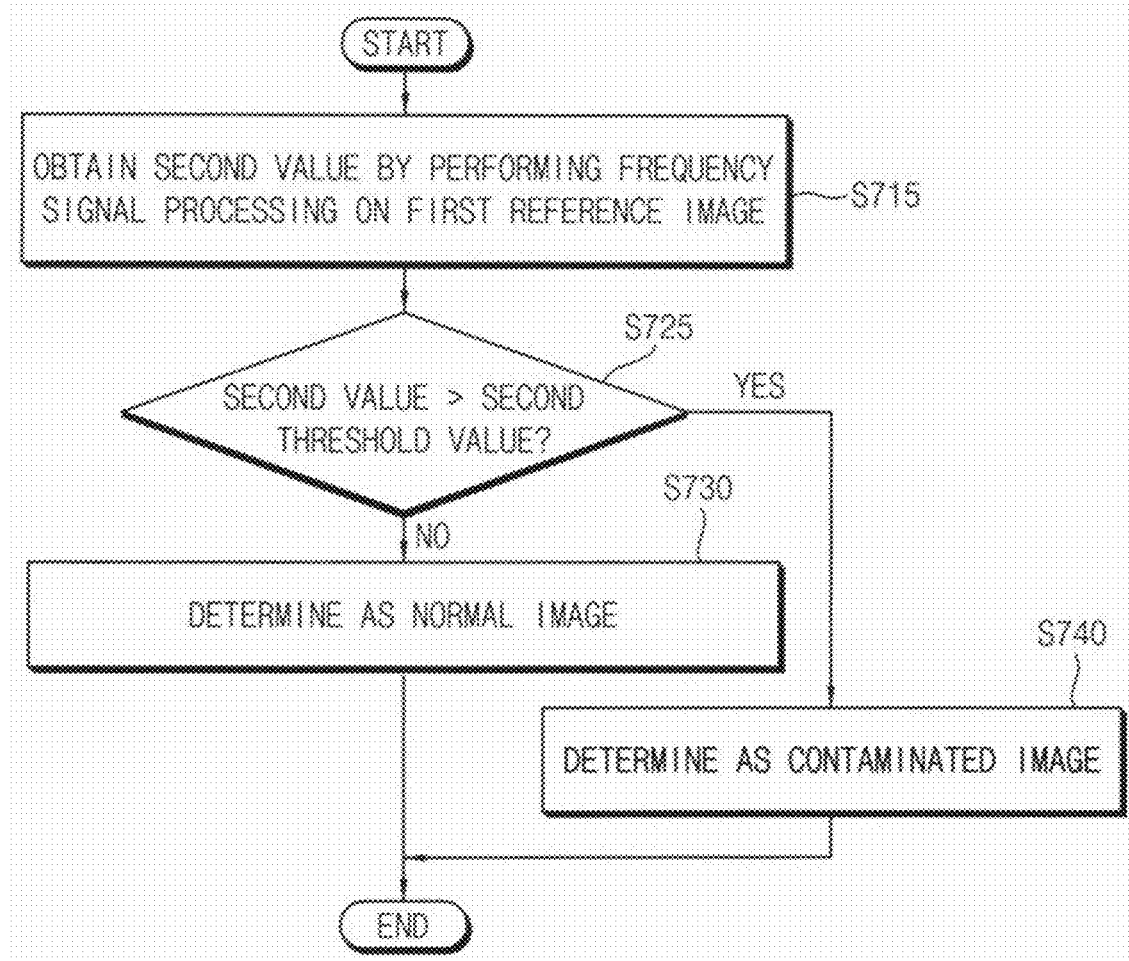

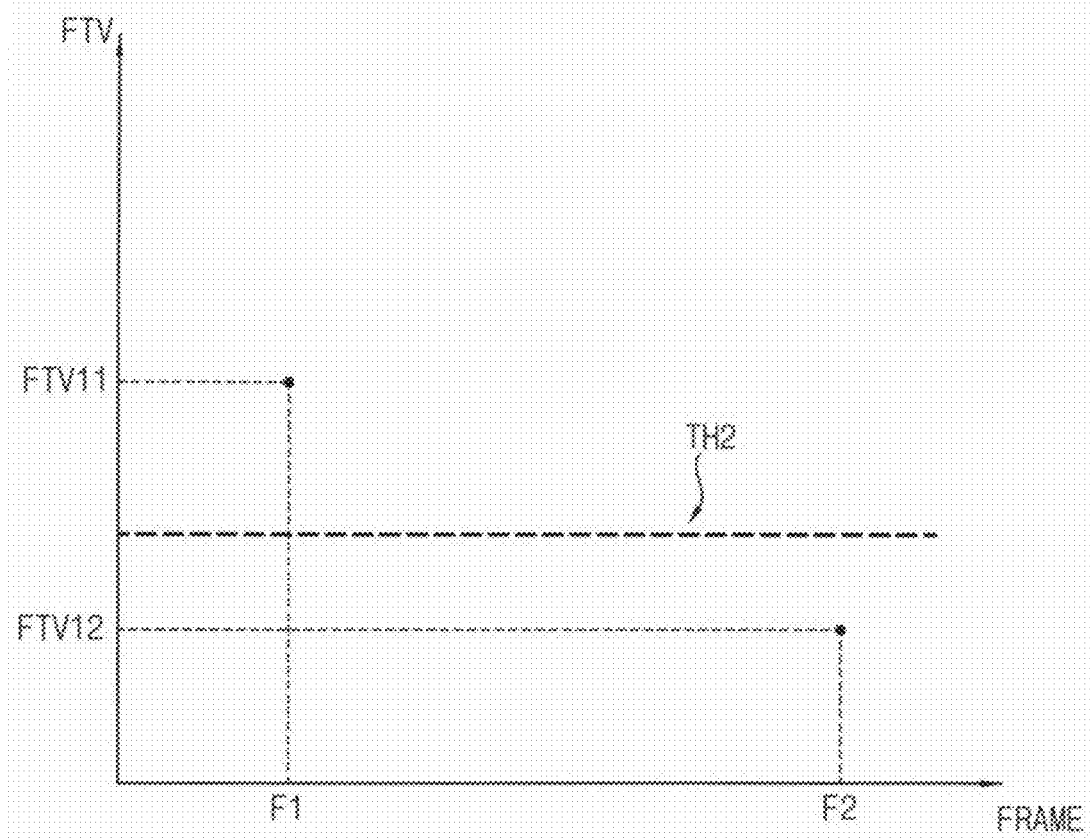

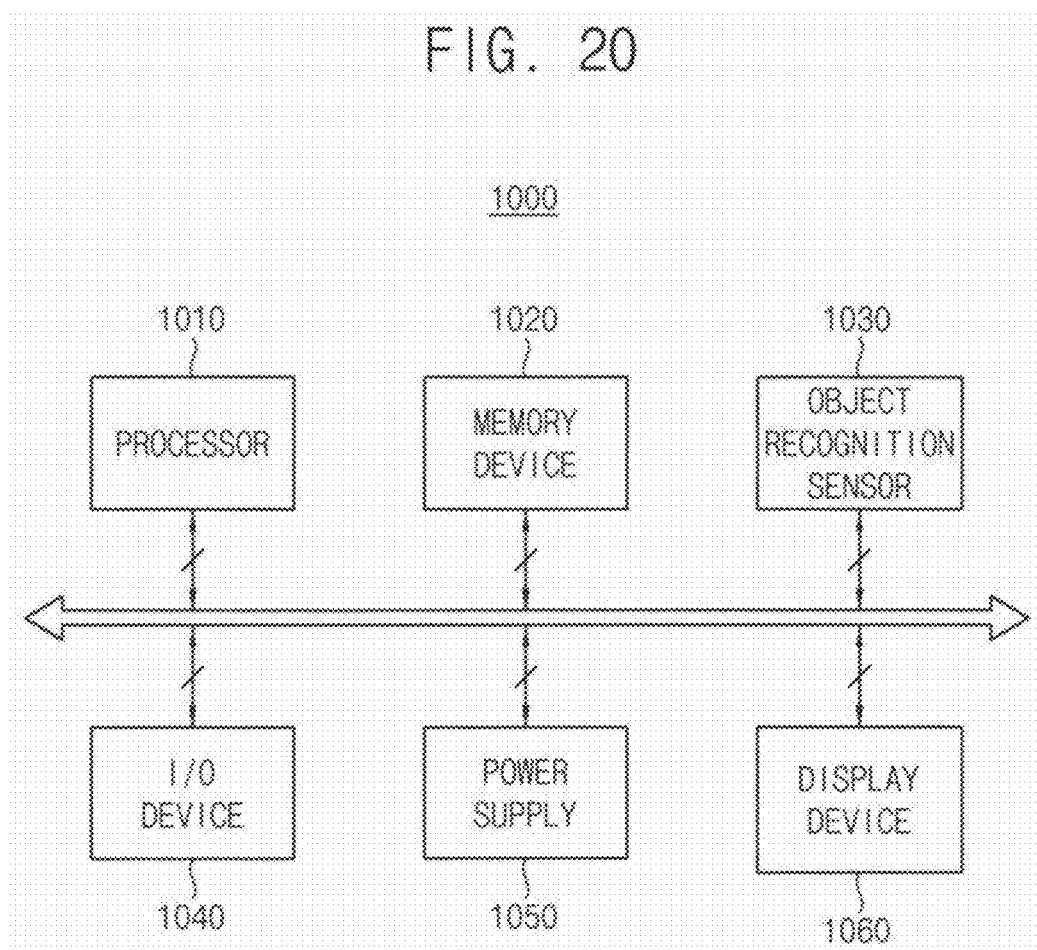

METHOD OF OBTAINING REFERENCE IMAGE FOR OPTICAL OBJECT RECOGNITION AND METHOD OF PERFORMING OPTICAL OBJECT RECOGNITION USING THE SAME

CROSS-REFERENCE TO RELATED APPLICATION

This application claims priority the benefit of priority under 35 USC § 119 to Korean Patent Application No. 10-2020-0050646, filed on Apr. 27, 2020 in the Korean Intellectual Property Office (KIPO), the contents of which are herein incorporated by reference in their entirety.

BACKGROUND

1. Technical Field

Various example embodiments relate generally to semiconductor integrated circuits, systems including the semiconductor integrated circuits, non-transitory computer readable media storing computer readable media, methods of obtaining reference images for optical object recognition using semiconductor integrated circuits, and/or methods of performing optical object recognition using the methods of obtaining the reference images.

2. Description of the Related Art

Biometric information is widely used in personal authentication because of its invariability and uniqueness to each individual person. One type of biometric information is a fingerprint. Fingerprint recognition may be performed conveniently and serves as an excellent way of determining the identity of a person. Optical fingerprint recognition obtains a fingerprint image based on differences in light reflected by ridges and valleys of a finger. Recently, optical object recognition for obtaining an object image based on light reflected by various objects has been researched in addition to the optical fingerprint recognition.

SUMMARY

At least one example embodiment of the inventive concepts provides a method of obtaining a reference image for optical object recognition capable of supporting efficient optical object recognition.

At least one example embodiment of the inventive concepts provides a method of performing optical object recognition using the method of obtaining the reference image.

According to at least one example embodiment, a method of obtaining a reference image for optical object recognition may include driving a subset of light sources of a plurality of light sources included in at least one display panel, the subset of light sources corresponding to an object recognition window which is a partial region of the display panel, receiving, using an object recognition sensor, light reflected off a first target object through the object recognition window, the light emitted by the subset of light sources, the first target object being a target of the optical object recognition, obtaining a first reference image based on the reflected light while the subset of light sources are driven, obtaining a first target image associated with the first target object based on the reflected light while the subset of light sources are driven, obtaining at least one first environment information using at least one environmental sensor while the subset of light sources are driven, the first environment information associated with a surrounding environment, storing the first reference image and the first environment information together, and obtaining a first effective image for optical object recognition associated with the first target object based on the first target image and the first reference image.

According to at least one example embodiment, a method of performing optical object recognition may include driving a subset of light sources of a plurality of light sources included in a display panel, the subset of light sources corresponding to an object recognition window which is a partial region of the display panel, obtaining, using an object recognition sensor, a plurality of reference images while the subset of light sources are driven, each of the plurality of reference images being an image which does not include a first target object, obtaining, using at least one environmental sensor, a plurality of environment information corresponding to the plurality of reference images while the subset of light sources are driven, obtaining, using the object recognition sensor, a first target image including the first target object while the subset of light sources are driven, obtaining, using the environmental sensor, current environment information corresponding to the first target image while the subset of light sources are driven, selecting a first reference image among the plurality of reference images based on the current environment information and the plurality of environment information, and obtaining a first effective image for the first target object based on the first target image and the first reference image.

According to at least one example embodiment, a method of obtaining a reference image for optical object recognition may include driving a subset of light sources of a plurality of light sources included in a display panel, the subset of light sources corresponding to an object recognition window which is a partial region of the display panel, receiving, using an object recognition sensor, light reflected through the object recognition window, the light emitted by the subset of light sources, sequentially obtaining a plurality of images based on the reflected light while the subset of light sources are driven, obtaining at least one of the plurality of images as a first reference image, the first reference image being an image that does not include a first target object, the obtaining the at least one of the plurality of images as the first reference image including, obtaining a first target image associated with the first target object based on the reflected light while the subset of light sources are driven, obtaining a plurality of first values by performing spatial signal processing on the plurality of images, obtaining a plurality of second values by performing frequency signal processing on the plurality of images, and selecting at least one image among the plurality of images as the first reference image based on a corresponding first value, a corresponding second value, a spatial domain threshold value, and a frequency domain threshold value, obtaining at least one first environment information using at least one environmental sensor while the subset of light sources are driven, the first environment information being associated with a surrounding environment in which the subset of light sources are driven, storing the first reference image and the first environment information for the first reference image together, and obtaining a first effective image for optical object recognition associated with the first target object based on the first target image and the first reference image.

In the method of obtaining the reference image for optical object recognition, and the method of performing optical object recognition according to some example embodiments, a target object-free image or an image without a target object (e.g., the reference image) used to perform the optical object recognition may be efficiently obtained. In addition, the target object-free image and the image including the target object may be obtained in the same environment or may be selected from the plurality of images sequentially obtained in the same environment such that the characteristics of noise, interference, etc. between the target object-free image and the target image including the target object are equal to or matched with each other. Accordingly, the robust object image restoration may be performed or the pure information associated with the target object may be robustly restored based on the target object-free image, and the efficient optical object recognition may be supported.

BRIEF DESCRIPTION OF THE DRAWINGS

Illustrative, non-limiting example embodiments will be more clearly understood from the following detailed description taken in conjunction with the accompanying drawings.

FIGS. 6 and 7 are flowcharts illustrating examples of the method of obtaining the reference image of FIG. 1 according to at least one example embodiment.

FIG. 9 is a flowchart illustrating another example of the method of obtaining the reference image of FIG. 1 according to at least one example embodiment.

FIG. 10 is a flowchart illustrating an example of checking whether a first reference image is a contaminated image in FIG. 9 according to at least one example embodiment.

FIGS. 11A, 11B, 11C, 11D and 12 are diagrams for describing an operation of checking whether the first reference image is the contaminated image of FIG. 10 according to at least one example embodiment.

FIG. 13 is a flowchart illustrating another example of checking whether the first reference image is the contaminated image in FIG. 9 according to at least one example embodiment.

FIG. 14 is a diagram for describing an operation of checking whether the first reference image is the contaminated image of FIG. 13 according to at least one example embodiment.

FIG. 20 is a block diagram illustrating an electronic device according to some example embodiments.

DETAILED DESCRIPTION

Figure 1:
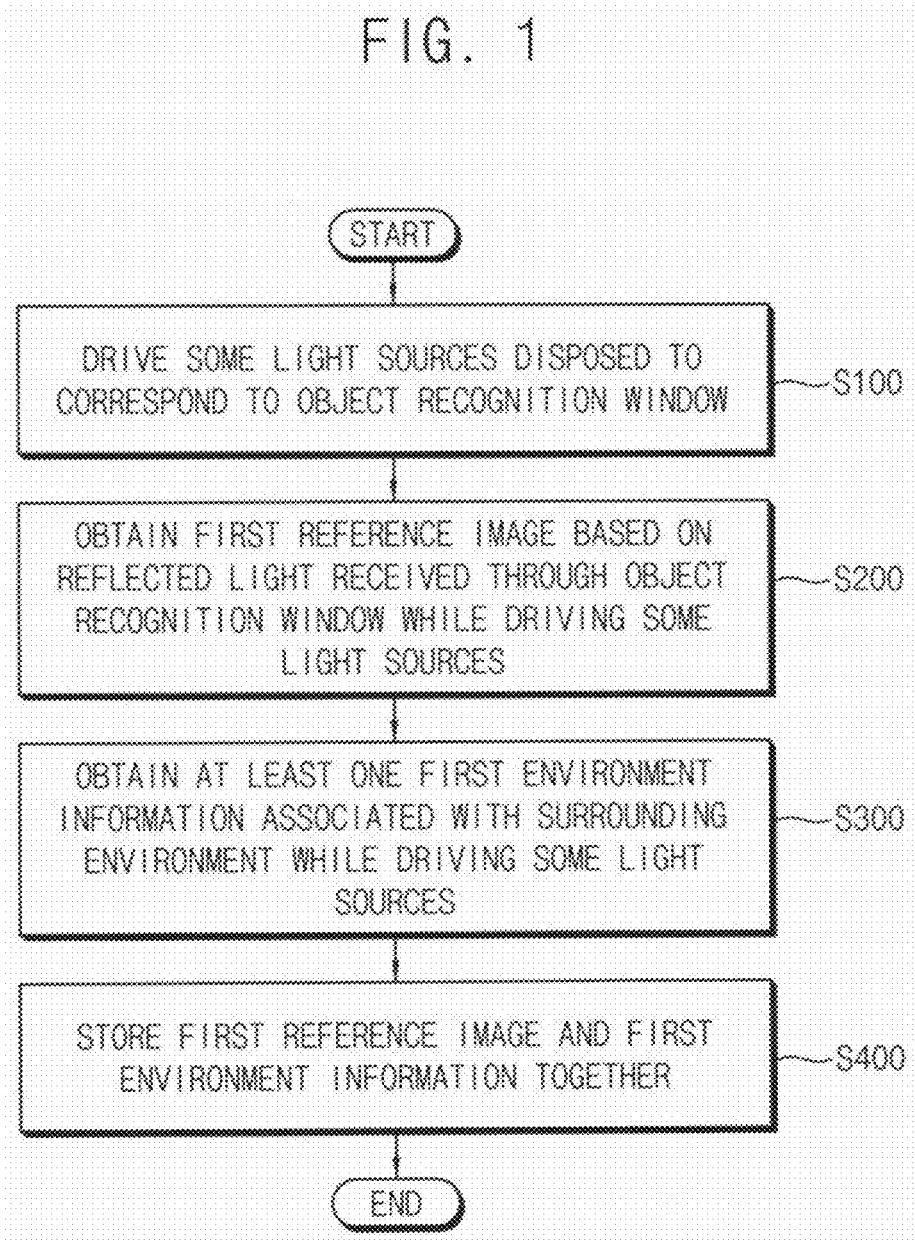
FIG. 1 is a flowchart illustrating a method of obtaining a reference image for optical object recognition according to some example embodiments.

Various example embodiments will be described more fully with reference to the accompanying drawings, in which embodiments are shown. The example embodiments of the inventive concepts may, however, be embodied in many different forms and should not be construed as limited to the example embodiments set forth herein. Like reference numerals refer to like elements throughout this application.

FIG. 1 is a flowchart illustrating a method of obtaining a reference image for optical object recognition according to some example embodiments.

Referring to FIG. 1, a method of obtaining a reference image for optical object recognition according to some example embodiments is performed by an electronic device that includes a display panel, an object recognition sensor, and/or at least one environmental sensor, but is not limited thereto and may include a greater or lesser number of constituent components. The display panel includes a plurality of light sources (e.g., pixels, etc.), the object recognition sensor performs the optical object recognition using light provided from (and/or emitted from, etc.) the plurality of light sources, and the at least one environmental sensor obtains environment information associated with a surrounding environment. Detailed configuration of the electronic device will be described with reference to FIGS. 2 through 4.

In the method of obtaining the reference image for the optical object recognition according to some example embodiments, some light sources (e.g., a first set of light sources, a subset of light sources, etc.) among the plurality of light sources included in the display panel are driven (operation S100). The some light sources are disposed to (and/or are arranged to) correspond to an object recognition window which is a partial region (e.g., a subset, a subregion, etc.) of the display panel. According to at least one example embodiment, all of the some light sources may emit light to have the same grayscale value, or the some light sources may emit light having different grayscale values and/or different color values, etc.

While the some light sources are driven, a first reference image for use for optical object recognition associated with a first object (e.g., a finger, etc.) is obtained or captured based on reflected light (e.g., light reflected from the first object) received by the object recognition sensor through the object recognition window (operation S200). In an example of FIG. 1, only one image may be obtained or acquired as a reference image, however the example embodiments are not limited thereto. Additionally, for example, all of the some light sources may be substantially simultaneously or concurrently turned on, but the example embodiments are not limited thereto. Light generated from the some light sources may be emitted to the object recognition window and may be reflected by any object (or an arbitrary object) located on and/or placed on the object recognition window, the reflected light may be provided to the object recognition sensor, and thus the object recognition sensor may obtain an image corresponding to the object recognition window and/or the any object based on the reflected light.

In some example embodiments, the first reference image may be an image that does not include the first object. Typically, a panel including a display panel and a touch sensor panel has a complicated internal structure including patterns of multi-layered wirings, electrodes, and the like. When an object is placed on an object recognition window while light sources in the object recognition window are illuminated, the reflected light received through the object recognition window may include information (e.g., an image, etc.) of the object placed on the object recognition window and information (e.g., an image, etc.) of the internal structure of the panel, such as the bottom view of the object and/or the internal structure of the panel, etc. Thus, in order to obtain only the information of the object placed on the object recognition window (e.g., the target object), information on the internal structure of the panel, which is an interference component, should be obtained first, and then a compensation factor should be applied to a subsequent image signal (e.g., second reference image, etc.) obtained of the target object, the compensation factor removing the interference component from the image signal obtained of the target object, etc., but the example embodiments are not limited thereto. Accordingly, the first reference image may represent the interference component, and may be referred to as calibration image or calibration data, etc.

In some example embodiments, a first object placed on the object recognition window may be a user's finger including a fingerprint of a user. In this example, the object recognition window and the object recognition sensor may be a fingerprint recognition window and a fingerprint recognition sensor, respectively. However, the example embodiments are not limited thereto, and the first object may be an object including biometric information such as a face and/or iris of a person and/or user, etc., for user authentication and security, or may be one of various objects, such as uniquely identifiable objects, etc., to be recognized including objects not corresponding to biometric information of a person.

While the some light sources are driven, at least one first environment information is obtained using the at least one environmental sensor (operation S300). The first environment information is associated with the surrounding environment in which the some light sources are driven. The first environment information may represent environment information on the surrounding environment at a time point when the first reference image is obtained.

In some example embodiments, the first environment information may include at least one of temperature information, humidity information, pressure information, motion information, temporal information, spatial information, illumination information, acceleration information, vibration information, external force information, and/or shock information, etc., or any combinations thereof. However, example embodiments are not limited thereto, and the first environment information may further include at least one of other various environment information and/or display setting information.

The first reference image and the first environment information for the first reference image are stored together (operation S400). Accordingly, as will be described with reference to FIG. 16, the first reference image may be selected based on or in consideration of the first environment information when an effective image is obtained.

In the method of obtaining the reference image for the optical object recognition according to some example embodiments, an object-free image or an image without an object (e.g., the first reference image, the calibration image, etc.) used to perform the optical object recognition that obtains only pure information associated with the object by subtracting the object-free image (e.g., first reference image, calibration image, etc.) from an image including the object (e.g., the second reference image, etc.) may be efficiently obtained. In addition, the object-free image and the image including the object may be obtained in the same environment (e.g., the same physical location and/or same physical/environmental conditions (e.g., lighting conditions, etc.), etc.) such that the characteristics of noise, interference, etc. between the object-free image and the image including the object are equal to or matched with each other. As described above, by obtaining and storing the environment information while obtaining the object-free image, the robust object image restoration may be performed or the pure information associated with the object may be robustly restored based on the object-free image, and the efficient optical object recognition may be supported.

Although FIG. 1 illustrates that, e.g., operation S200 is performed prior to S300, the example embodiments are not limited thereto, and operations S200 and S300 may be substantially simultaneously performed, or operation S300 may be performed prior to operation S200.

Figure 2:
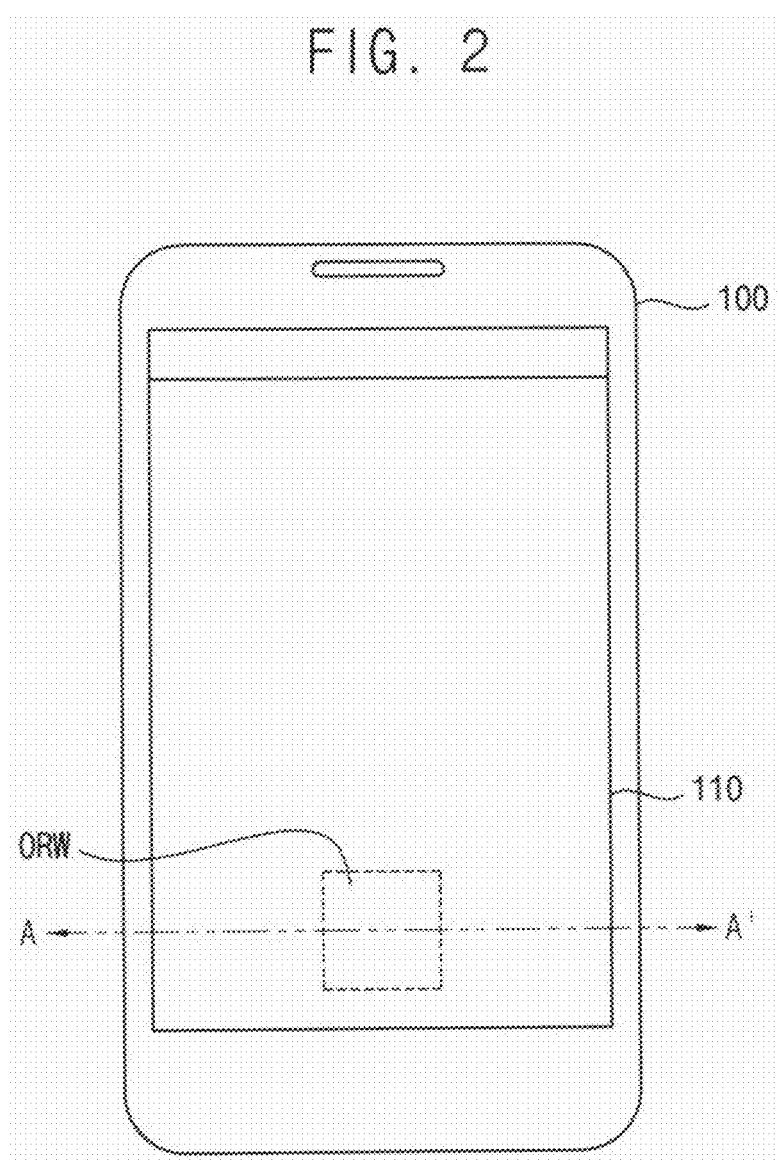
FIG. 2 is a plan view of an electronic device according to some example embodiments.

FIG. 2 is a plan view of an electronic device according to some example embodiments.

Referring to FIG. 2, an electronic device 100 includes at least one panel 110 to interface with a user. The user of the electronic device 100 may view information, graphics, etc., output from the electronic device 100 through the panel 110. The user of the electronic device 100 may also input at least one signal to the electronic device 100 through the panel 110. For example, the panel 110 may include a display panel for outputting visual information to the user, a touch sensor panel for sensing a touch input of the user, and/or the like, or any combinations thereof. While only a single panel 110 is illustrated in FIG. 2, the example embodiments are not limited thereto and there may be two or more display panels included in the electronic device 100, etc.

An object recognition window ORW may be provided (e.g., arranged, located, included, etc.) on the panel 110. As will be described with reference to FIG. 3, an object recognition sensor for object detection may be disposed (e.g., arranged, located, included, etc.) to spatially correspond to a location of the object recognition window ORW. Although the object recognition window ORW is illustrated as a rectangle in FIG. 2 and subsequent figures, the shape, location, and/or number of the object recognition window(s) ORW may be changed in other example embodiments.

In some example embodiments, the electronic device 100 may be or include any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, or the like.

One or more example embodiments may provide at least one interface used to detect an object. For example, in the case of fingerprint detection, a function of the fingerprint detection may be performed when the user contacts and/or approaches the panel 110. According to some example embodiments, the interface and the object recognition sensor used for the object detection may share an area on the electronic device 100 with the panel 110, and thus the interface and the object recognition sensor may not require an additional area on the electronic device 100, but the example embodiments are not limited thereto. Accordingly, it may be possible to reduce the size of the electronic device 100, or a spare area may be used for other purpose(s).

Figure 3:
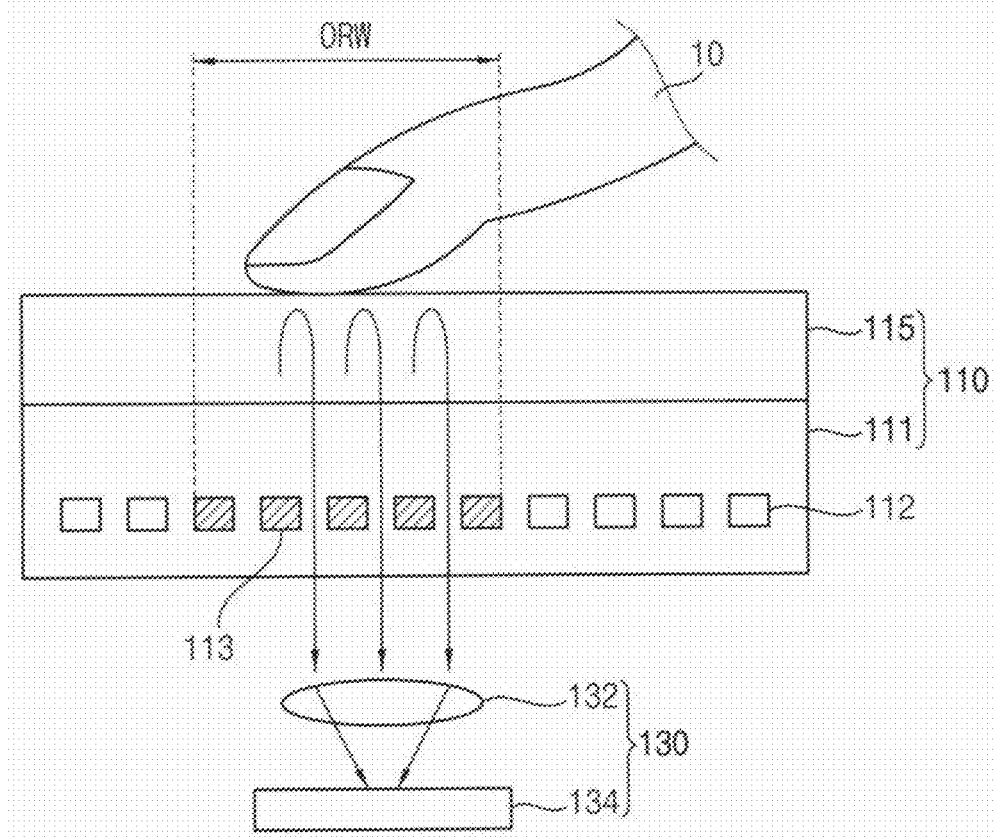
FIG. 3 is a cross-sectional view of an example of the electronic device taken along a line A-A' of FIG. 2 according to at least one example embodiment.

FIG. 3 is a cross-sectional view of an example of the electronic device taken along a line A-A' of FIG. 2 according to at least one example embodiment.

Referring to FIG. 3, the object recognition window ORW may be displayed on a partial region (or portion, subregion, etc.) of the panel 110 in an object recognition mode. The panel 110 may include at least one display panel 111 and at least one touch sensor panel 115, etc., but is not limited thereto.

The display panel 111 may include a plurality of light sources 112. For example, as will be described with reference to FIG. 4, the plurality of light sources 112 may be included in a plurality of pixels included in the display panel 111. Among the plurality of light sources 112, only some light sources 113 (e.g., a subset, a first subset, etc., of light sources) that are disposed (and/or located, included, arranged, etc.) to correspond to the object recognition window ORW may be driven substantially simultaneously in the object recognition mode. In FIG. 3, the some light sources 113 that are driven and emit light are hatched.

An object recognition sensor 130 may be disposed under the panel 110 such that the object recognition sensor 130 may overlap the object recognition window ORW in a vertical direction. In other words, the panel 110 may include a first surface on which an image is displayed and a second surface opposite to the first surface, and the object recognition sensor 130 may be disposed under the second surface of the panel 110, but the example embodiments are not limited thereto, and the object recognition sensor 130 and/or ORW may be arranged in alternative directions and/or orientations, etc.

The object recognition sensor 130 may include at least one lens 132 and/or at least one image sensor 134, etc. The lens 132 may be disposed (and/or located, included, arranged, etc.) under the panel 110 (e.g., disposed between the panel 110 and the image sensor 134), and may concentrate and/or focus reflected light received through the object recognition window ORW onto the image sensor 134. The image sensor 134 may be disposed (and/or located, included, arranged, etc.) under the lens 132, and may generate an image signal for an object on the partial region based on the reflected light concentrated by the lens 132. In some example embodiments, the lens 132 may be omitted in the object recognition sensor 130.

For example, in a case of fingerprint detection where a user puts a finger 10 on the object recognition window ORW as illustrated in FIG. 3, light generated from the some light sources 113 within the object recognition window ORW may be reflected off of the finger 10 and/or the fingerprint of the finger 10, and reflected light of the (e.g., associated with and/or corresponding to the) fingerprint may be provided to the object recognition sensor 130. The object recognition sensor 130 may capture an image signal for the fingerprint or information associated with a shape of the fingerprint (e.g., a fingerprint image) based on the reflected light of the fingerprint received through the object recognition window ORW, etc.

For another example, in a case of obtaining a reference image (e.g., the first reference image, calibration image, etc.) for object recognition, an object may not be placed on the object recognition window ORW, or any white or black object that is flat without bending may be disposed (and/or located, included, arranged, etc.) on the object recognition window ORW to facilitate obtaining the reference image, and reflected light based on light generated from the some light sources 113 within the object recognition window ORW may be provided to the object recognition sensor 130, etc. The object recognition sensor 130 may capture an image signal for the reference image (e.g., an image representing the internal structure of the panel 110) based on the reflected light received through the object recognition window ORW, but is not limited thereto.

Although not illustrated in FIG. 3, the object recognition sensor 130 may further include at least one filter for, e.g., adjusting a frequency characteristic and/or a polarization characteristic of the reflected light which is to be provided to the image sensor 134, etc., but the example embodiments are not limited thereto.

Figure 4:
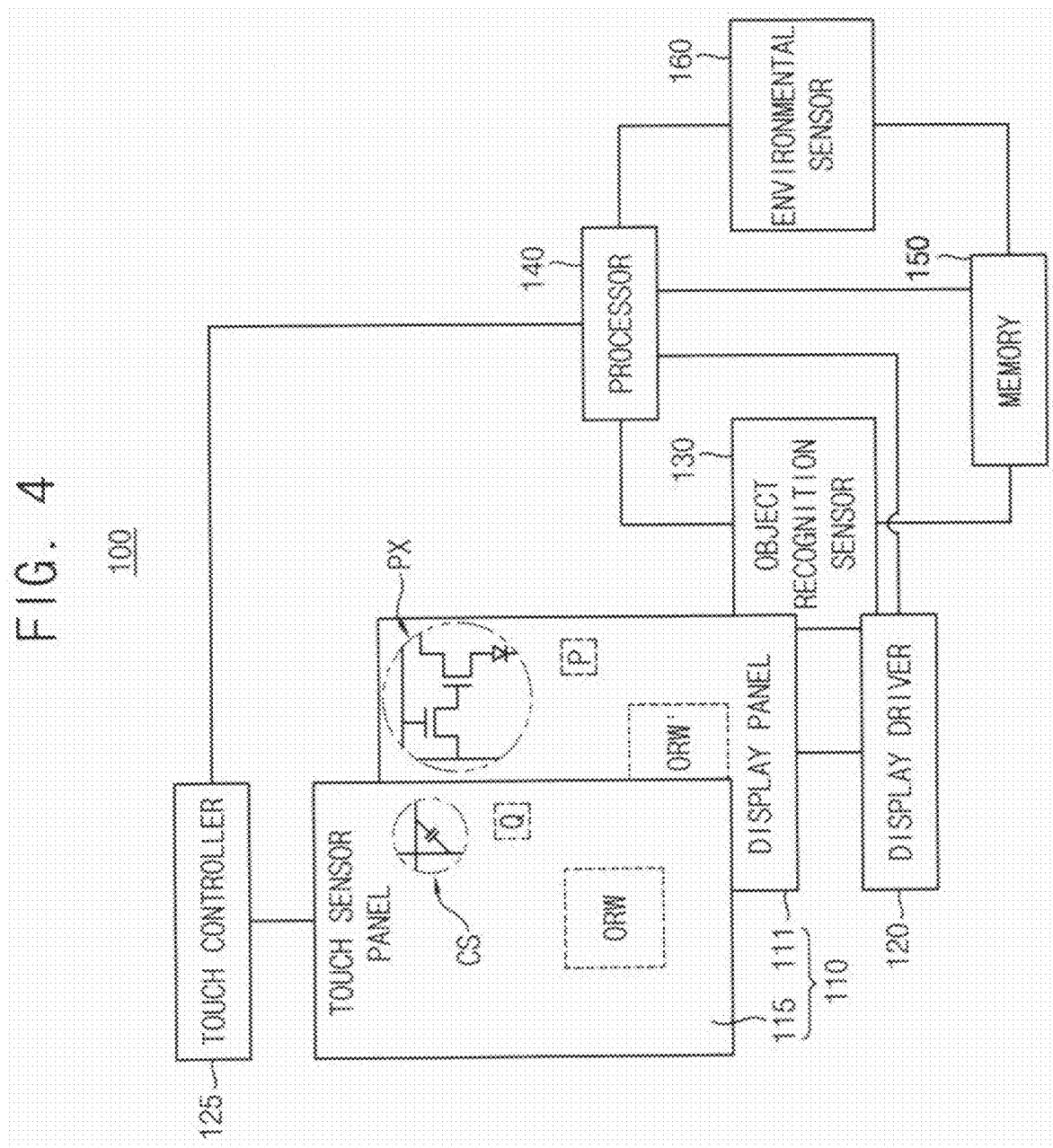
FIG. 4 is a block diagram illustrating an example of the electronic device of FIG. 2 according to at least one example embodiment.

FIG. 4 is a block diagram illustrating an example of the electronic device of FIG. 2 according to at least one example embodiment.

Referring to FIG. 4, the electronic device 100 includes the at least one panel 110 and/or the at least one object recognition sensor 130, etc., but the example embodiments are not limited thereto. The panel 110 may include the display panel 111 and/or the touch sensor panel 115, etc., but is not limited thereto. The electronic device 100 may further include processing circuitry, the processing circuitry including one or more of a display driver 120, a touch controller 125, at least one processor 140, a memory 150, and/or at least one environmental sensor 160, but the example embodiments are not limited thereto. According to some example embodiments, the processing circuitry is capable of performing the functionality of one or more of the display driver 120, touch controller 125, at least one processor 140, memory 150, and/or at least one environmental sensor 160, etc. The processing circuitry may include hardware, such as processors, processor cores, logic circuits, storage devices, etc.; a hardware/software combination such as at least one processor core executing software and/or executing any instruction set, etc.; or a combination thereof. For example, the processing circuitry more specifically may include, but is not limited to, a field programmable gate array (FPGA), a programmable logic unit, an application-specific integrated circuit (ASIC), s System-on-Chip (SoC), etc. In other example embodiments, the display driver 120, touch controller 125, at least one processor 140, memory 150, and/or at least one environmental sensor 160 may be combined into a single circuit, or one or more separate circuits/components/elements, etc.

The touch sensor panel 115 may sense contact and/or sense the proximity of an object (e.g., a finger of the user, etc.). The touch sensor panel 115 may generate a sensing signal in response to the contact or proximity of the object. The touch sensor panel 115 may include a plurality of sensing capacitors which are formed along rows and columns, but are not limited thereto. FIG. 4 illustrates one example sensing capacitor CS. Capacitance values of the sensing capacitors may vary in response to the contact or proximity of the object, and therefore the touch sensor panel 115 may sense the contact and/or proximity based on the capacitance values of the sensing capacitors, but the example embodiments are not limited thereto, and the touch sensor panel 115 may use other techniques to sense the contact and/or proximity of the object, such as sensing an amount of pressure asserted on the touch sensor panel 115, sensing a light level in proximity to the touch sensor panel 115, etc.

The touch controller 125 may control operations of the touch sensor panel 115. The touch controller 125 may process at least one operation associated with the contact and/or proximity of the object based on the sensing signal output from the touch sensor panel 115, etc. For example, the touch controller 125 may recognize the contact and/or proximity of the object based on variation in the capacitance values of the sensing capacitors, but the example embodiments are not limited thereto. For example, when the sensing signal is associated with execution or operation of a specific application, the touch controller 125 may output at least one command to at least one processor 140, etc., such that the specific application is to be executed or to operate.

The display panel 111 outputs visual information (e.g., text, graphics, images, videos, etc.) to the user. The display panel 111 may include a plurality of pixels which are arranged along rows and columns to display the visual information (e.g., an image, video, text, etc.). FIG. 4 illustrates one example pixel PX, but the example embodiments are not limited thereto. Each pixel may be configured to emit light of a specific color (e.g., light of a desired color value and/or not emit light, etc.) which forms the image. As the plurality of pixels emit light together, the display panel 111 may display a desired and/or intended visual information (e.g., image, video, text, etc.).

In some example embodiments, the display panel 111 may be an electroluminescent display panel, but is not limited thereto. The electroluminescent display panel may be driven with rapid response speed and low power consumption using at least one light emitting diode (LED) or at least one organic light emitting diode (OLED) that generates light by recombination of electrons and holes. In comparison with a liquid crystal display panel using a backlight unit, pixels of the electroluminescent display panel may emit light by themselves, and the reflected light received through the object recognition window ORW (or an object recognition window ORW') may be provided to the object recognition sensor 130 under the display panel 111 through a space (or gap) between the pixels. Thus, light emitting diodes or organic light emitting diodes included in the pixels may correspond to the light sources included in the display panel according to at least one example embodiment. However, example embodiments are not limited thereto, and the display panel 111 may be any display panel having a structure in which the reflected light received through the object recognition window ORW or ORW' may be provided to the object recognition sensor 130, etc.

The display driver 120 may control operations of the display panel 111, and may drive the display panel 111. For example, the display driver 120 may suitably drive (e.g., supply a driving voltage, etc.) each pixel of the display panel 111 in response to at least one command of the, e.g., processor 140 such that the desired or intended image is displayed on the display panel 111, but is not limited thereto. For example, the display driver 120 may partially drive the display panel 111 such that pixels corresponding to the object recognition window ORW' emit light, but is not limited thereto. Although not illustrated in FIG. 4, the display driver 120 may include a data driver, a scan driver, a timing controller, a gamma circuit, etc.

Each coordinate on the touch sensor panel 115 may be matched with a corresponding coordinate on the display panel 111. For example, the display panel 111 may display interface information on a specific area P. The user may contact or approach a specific area Q on the touch sensor panel 115 to input a command through the displayed interface information. Herein, a coordinate of the specific area Q may be matched with and/or correspond to a coordinate of the specific area P. Accordingly, contact or proximity on or to the specific area Q may be processed in association with the interface information displayed on the specific area P, etc.

In some example embodiments, the touch sensor panel 115 may be implemented separately from the display panel 111. For example, as illustrated in FIG. 4, the touch sensor panel 115 may be placed on or over the display panel 111. However, the example embodiments are not limited thereto. For another example, unlike that illustrated in FIG. 4, the display panel 111 may be placed on or over the touch sensor panel 115. Alternatively, the touch sensor panel 115 and the display panel 111 may be implemented in one single panel, etc.

The object recognition sensor 130 may be used to detect an object. The object recognition sensor 130 may generate/output an image signal associated with the object which is on and/or proximate to the object recognition window ORW. For example, in a case of the fingerprint detection, the object recognition sensor 130 may operate to obtain an image signal associated with a fingerprint of a finger which contacts or approaches the object recognition window ORW, but the example embodiments are not limited thereto. As described with reference to FIG. 3, the object recognition sensor 130 may include the lens 132 and the image sensor 134, but the example embodiments are not limited thereto, and for example, the lens 132 may be omitted, there may more than one lens 132 and/or more than one image sensor 134, etc.

The object recognition sensor 130 may provide a function of optical object recognition and/or optics-based object detection. For example, the image sensor 134 included in the object recognition sensor 130 may include photo-diode(s) which is capable of generating current in response to light, but the example embodiments are not limited thereto.

As described with reference to FIG. 2, the object recognition window ORW may be provided on the panel 110, for example, on the touch sensor panel 115. In addition, the object recognition window ORW' may be provided on the display panel 111 to correspond to the object recognition window ORW. The object recognition sensor 130 may be under (e.g., disposed under, included under, located under, etc.) the display panel 111 to spatially correspond to a location of the object recognition window ORW and a location of the object recognition window ORW', but the example embodiments are not limited thereto.

In some example embodiments, the location of the object recognition window ORW may be associated with coordinates on the touch sensor panel 115, and the location of the object recognition window ORW' may be associated with coordinates on the display panel 111, etc. In addition, the location and a size of each of the object recognition windows ORW and ORW' may be modified or changed depending on the arrangement of the object recognition sensor 130.

The at least one processor 140 may control overall operations of the electronic device 100. The processor 140 may process/perform various arithmetic/logical operations to provide functions of the electronic device 100, etc.

The processor 140 may communicate with the display driver 120, the touch controller 125, the object recognition sensor 130, the memory 150 and/or the environmental sensor 160, etc. The processor 140 may control operations of the display driver 120, the touch controller 125, the object recognition sensor 130, the memory 150 and/or the environmental sensor 160, etc., but is not limited thereto. The processor 140 may process commands, requests, responses, and/or the like, which are associated with operations of the display driver 120, the touch controller 125, the object recognition sensor 130, the memory 150 and/or the environmental sensor 160, etc.

For example, the processor 140 may process a command received from the touch controller 125 to understand (e.g., realize, implement, execute, etc.) a user command input through the touch sensor panel 115. For example, the processor 140 may provide a variety of information to the display driver 120 to display the desired or intended image on the display panel 111. For example, the processor 140 may control an operation timing/sequence of the display panel 111 and/or the object recognition sensor 130 such that the object recognition sensor 130 generates signals associated with the object image and/or the reference image, etc. For example, the processor 140 may generate and/or analyze information associated with the object image and/or the reference image based on the signals output from the object recognition sensor 130, etc. For example, the processor 140 may receive and/or analyze information about the surrounding environment from the environmental sensor 160, etc. For example, the processor 140 may store associated data in the memory 150 and/or may load the associated data from the memory 150, etc.

In some example embodiments, the processor 140 may include one or more special-purpose circuits (e.g., a field programmable gate array (FPGA), application specific integrated chips (ASICs), and/or the like) to perform various operations. For example, the processor 140 may include one or more processor cores which are capable of performing various operations. For example, the processor 140 may be implemented with a special-purpose (e.g., custom designed) processor, a general-purpose processor loaded with special purpose computer readable instructions for implementing one or more methods of the example embodiments, thereby transforming the general-purpose processor to become a special-purpose processor, and/or an application processor, etc.

The at least one environmental sensor 160 may collect, sense, and/or determine, etc., environment information about the surrounding environment in which the electronic device 100 is driven. For example, the environmental sensor 160 may collect the environment information when a reference image (e.g., calibration image) and/or image of the target object image, is obtained (e.g., at the same time as when the reference image, calibration image, and/or target object image is captured, and/or before or after the reference image, etc., is captured), may collect the environment information to check an unused (or non-use) state, or may periodically or intermittently collect the environment information.

In some example embodiments, the environmental sensor 160 may include at least one of a temperature sensor, a humidity sensor, a pressure sensor, a motion sensor, a temporal sensor, a spatial sensor, an illumination sensor, an acceleration sensor, a vibration sensor, an external force sensor, a shock sensor, etc., or any combinations thereof. However, the example embodiments are not limited thereto, and the environmental sensor 160 may further include at least one sensor that collects the environment information, such as a radiation sensor, a dust sensor, an electrical stress sensor, or the like.

Although not illustrated in FIG. 4, a sensor control circuit for controlling the environmental sensor 160 may be included in the processing circuitry, e.g., processor 140, etc., or may be implemented separately from the processing circuitry and/or processor 140. For example, the sensor control circuit may include a parameter adjusting unit (e.g., parameter adjusting circuitry, parameter adjusting functionality, parameter adjusting module, etc.) that determines types and setting of the sensors, a control unit (e.g., control circuitry, control module, control functionality, etc.) that controls operations of the sensors, and a trigger unit (e.g., trigger circuitry, trigger module, trigger functionality, etc.) that turns on/off (e.g., triggers, toggles, etc.) the sensors based on values received from the parameter adjusting unit and/or the control unit, etc., but is not limited thereto.

The memory 150 may store data associated with or related to the operation of the electronic device 100. For example, the memory 150 may store the reference image, the environment information, and the like, for performing the method of obtaining the reference image according to at least one example embodiment.

In some example embodiments, the memory 150 may include at least one of various volatile memories such as a dynamic random access memory (DRAM), a static random access memory (SRAM), or the like, and/or at least one of various nonvolatile memories such as a flash memory, a phase change random access memory (PRAM), a resistance random access memory (RRAM), a magnetic random access memory (MRAM), a ferroelectric random access memory (FRAM), a nano floating gate memory (NFGM), a polymer random access memory (PoRAM), or the like.

In some example embodiments, the display driver 120, the touch controller 125, the object recognition sensor 130, the processor 140, the memory 150 and the environmental sensor 160 may be respectively implemented with separate circuits/modules/chips. In other example embodiments, on the basis of a function, some of the display driver 120, the touch controller 125, the object recognition sensor 130, the processor 140, the memory 150 and the environmental sensor 160 may be combined into one circuit/module/chip, or may be further separated into a plurality of circuits/modules/chips.

The electronic device 100 may perform the method of obtaining the reference image according to example embodiments described with reference to FIG. 1. For example, the display panel 111 and the display driver 120 may perform operation S100 in FIG. 1, the object recognition sensor 130 may perform operation S200 in FIG. 1, the environmental sensor 160 may perform operation S300 in FIG. 1, and the memory 150 may perform operation S400 in FIG. 1. In addition, the electronic device 100 may perform a method of obtaining a reference image which will be described with reference to FIG. 15 and/or a method of performing optical object recognition which will be described with reference to FIG. 16, but is not limited thereto.

In some example embodiments, at least some of the components included in the electronic device 100 may be omitted. For example, when touch detection is unnecessary, the touch sensor panel 115 and the touch controller 125 may be omitted, etc.

FIGS. 5A, 5B, 5C and 5D are diagrams for describing a method of obtaining a reference image for optical object recognition according to some example embodiments.

Hereinafter, some example embodiments will be described in detail based on fingerprint recognition. However, the example embodiments are not limited thereto, and the example embodiments may be employed or adopted to recognize one of various objects, including non-biometric related objects, such as uniquely identifiable inanimate objects, etc.

Figure 5A:
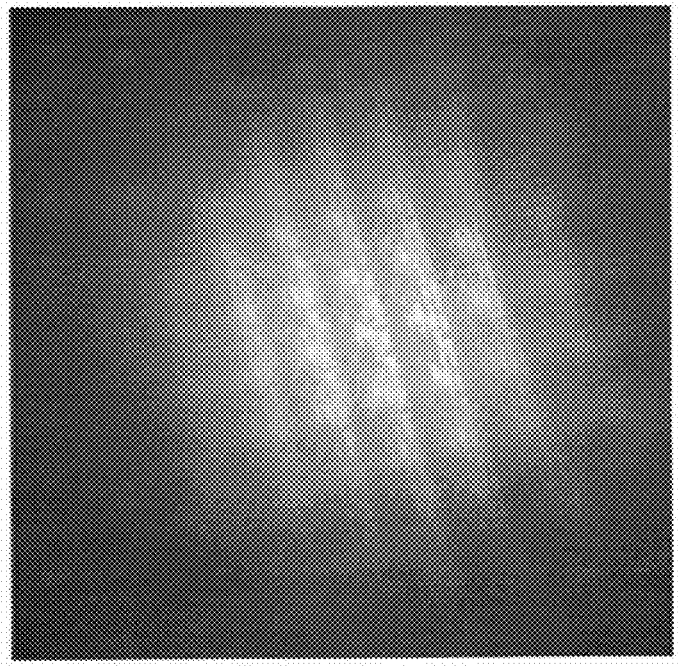
FIGS. 5A, 5B, 5C and 5D are diagrams for describing a method of obtaining a reference image for optical object recognition according to some example embodiments.

FIG. 5A illustrates an image obtained based on reflected light without a fingerprint (e.g., without a finger of a user) or reflected light by an object used for obtaining a reference image. The image of FIG. 5A may correspond to the reference image (e.g., first reference image, calibration image, etc.) in FIG. 1 that is obtained by the object recognition sensor, and may include only information of the internal structure of the display panel, but is not limited thereto.

Figure 5B:
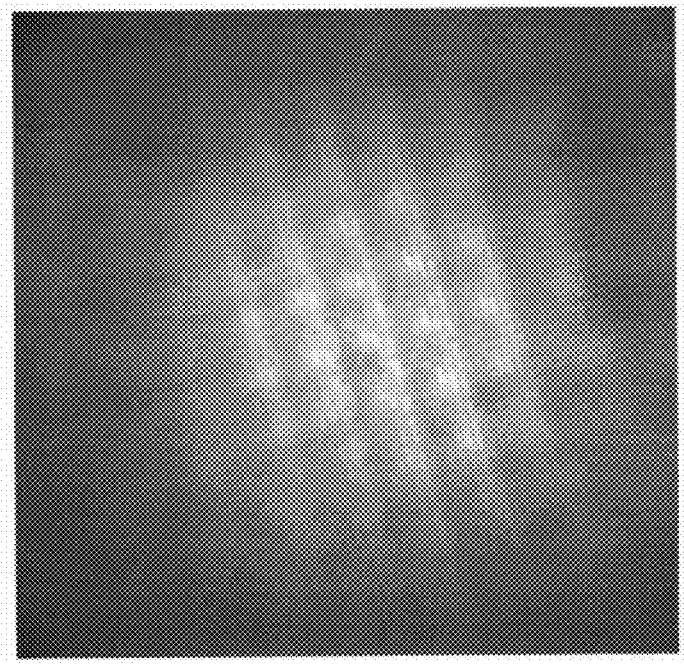

FIG. 5B illustrates an image obtained based on light reflected by an object (e.g., the finger of the user, the fingerprint, etc.). The image of FIG. 5B may also be obtained by the object recognition sensor, and may include both information of the fingerprint and the information of the internal structure of the display panel, but is not limited thereto.

Figure 5C:
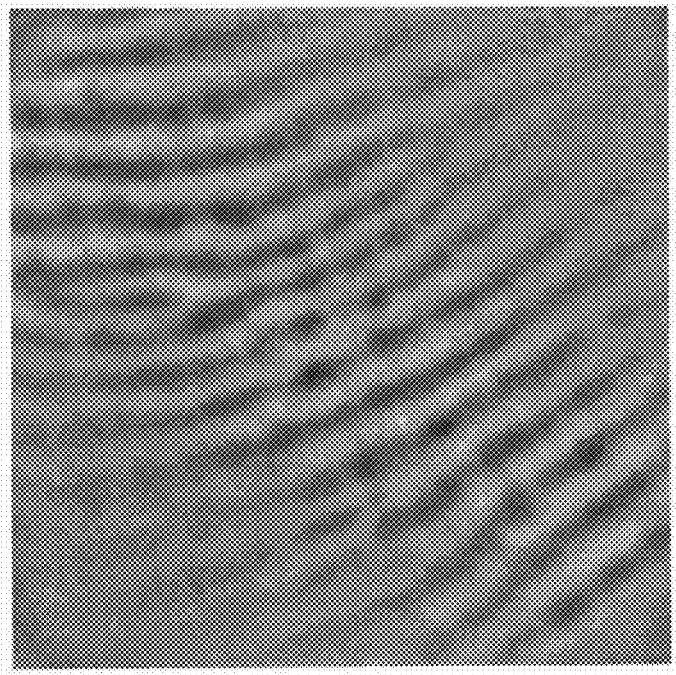
Figure 5D:
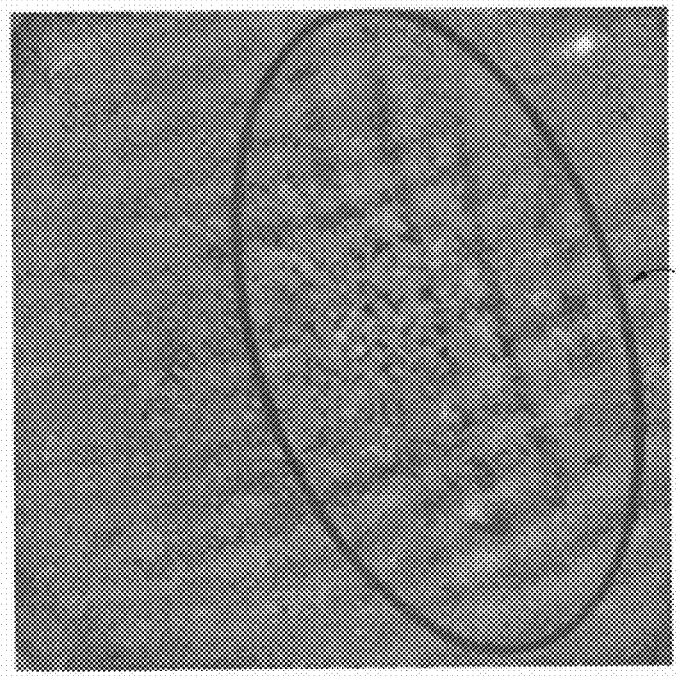

FIGS. 5C and 5D illustrate examples of a pure object image (e.g. a pure fingerprint image, a pure target image, etc.) obtained based on the images of FIGS. 5A and 5B. For example, the image of FIG. 5A including only a pure interference component without the fingerprint may be obtained first, the image of FIG. 5B including both the fingerprint and the interference component (e.g., an undesired image component, the image of the sensor, etc.) may be obtained next, and then a pure fingerprint image (e.g., pure object image and/or pure target image, etc.) may be obtained by applying and/or performing compensation to remove the interference component. For example, the pure fingerprint image may be obtained by performing a simple surface (or face) subtraction to obtain a difference between the image of FIG. 5B and the image of FIG. 5A, but the example embodiments are not limited thereto.

As illustrated in FIG. 5C, a pure fingerprint image in which the interference component is completely removed may be obtained. However, as illustrated in FIG. 5D, at least one residual component RES may remain or may be left without the interference component being completely removed. For example, the interference component may vary depending on the temperature and/or pressure when the finger of the user is placed on the object recognition window, etc. Particularly, deformation (e.g., rotation, scaling, translation, etc.) may occur on the interference component in the image of FIG. 5B, and thus the residual component RES may occur because there is a spatial mismatch between the interference component in the image of FIG. 5A and the interference component in the image of FIG. 5B, etc., but is not limited thereto.

To decrease and/or minimize such residual component RES, the reference image may be obtained in the same environment as the image including the fingerprint, as described with reference to FIG. 1, and/or at least one of a plurality of images that are sequentially or continuously obtained may be obtained as the reference image, as will be described with reference to FIG. 15.

Figure 7:
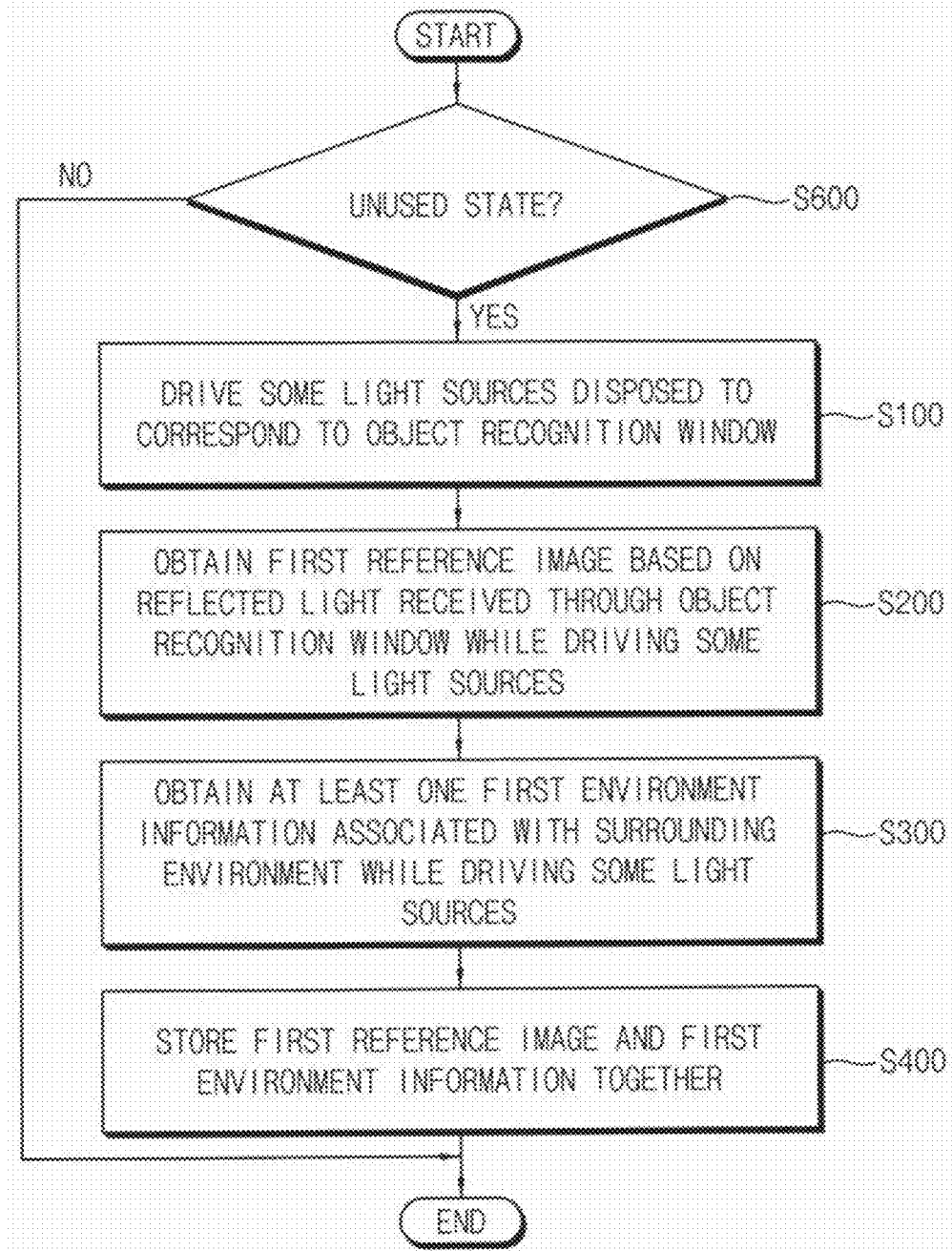

FIGS. 6 and 7 are flowcharts illustrating examples of the method of obtaining the reference image of FIG. 1 according to some example embodiments. The descriptions of repeated elements with FIG. 1 will be omitted.

Referring to FIG. 6, in the method of obtaining the reference image for the optical object recognition according to at least one example embodiment, a touch input of a user may be sensed by a touch sensor panel (operation S500). For example, operation S500 in FIG. 6 may be performed by the touch sensor panel 115 and the touch controller 125 in FIG. 4, but the example embodiments are not limited thereto.

When the touch input is sensed (operation S500: YES), operations S100, S200, S300 and/or S400 may be performed to drive the some light sources and to obtain and store the first reference image and the first environment information, etc., but the example embodiments are not limited thereto. Operations S100, S200, S300 and/or S400 in FIG. 6 may be substantially the same as described with reference to FIG. 1, but are not limited thereto, and for example, one or more of the operations may be performed simultaneously, may be performed in a different order than shown, may be omitted, additional operations may be performed, etc.

When the touch input is not sensed (operation S500: NO), the process may be terminated without obtaining the first reference image, but the operation is not limited thereto, and for example, the process may be repeated, etc.

Referring to FIG. 7, in the method of obtaining the reference image for the optical object recognition according to at least one example embodiment, it may be checked whether the display panel or the electronic device is in and/or has an unused state, e.g., an off state, an inactive state, a deactivated state, etc. (operation S600). The unused state may represent a state in which the display panel is inactive, disabled, and/or deactivated (e.g., not turned on), and may be referred to as an idle state or a power down state, etc.

In some example embodiments, the display panel may be checked by the electronic device to determine whether the display panel or the electronic device is in and/or has been in the unused state, e.g., based on whether the plurality of light sources included in the display panel are driven, but the example embodiments are not limited thereto. For example, when a number of light sources greater than a desired reference number (e.g., desired threshold number, etc.) among the plurality of light sources do not emit light, do not receive voltage from the display driver, and/or are turned off, e.g., when almost of the plurality of light sources other than the some light sources disposed to correspond to the object recognition window do not emit light and are turned off, etc., it may be determined that the display panel or the electronic device is in the unused state. However, the example embodiments are not limited thereto, and for example, an average of the number of light sources emitting light and/or being driven, etc., over a desired period of time may be calculated and the average number may be compared to the desired reference number to determine whether the display panel and/or electronic device is in the unused state, etc. In this example, operation S600 may be performed by the display panel 111 and the processor 140 in FIG. 4, but the example embodiments are not limited thereto.

In other example embodiments, it may be checked whether the display panel and/or the electronic device has the unused state using the at least one environmental sensor. For example, the environmental sensor may include an acceleration sensor, and the state of the display panel and/or the electronic device may be checked whether the display panel or the electronic device has been in the unused state based on acceleration information obtained by the acceleration sensor. In this example, operation S600 may be performed by the environmental sensor 160 and the processor 140 in FIG. 4. As another example, the environmental sensor may include use a pressure sensor that detects the amount of pressure being applied by a user to the display panel and/or the electronic device, and/or the environmental sensor may include a camera that detects whether a user's face and/or eyes are facing the display panel, to determine whether the electronic device and/or display panel are in the unused state, etc.

When the display panel and/or the electronic device is in and/or has been in the unused state (operation S1600: YES), operations S100, S200, S300 and/or S400 may be performed to drive the some light sources and to obtain and store the first reference image and the first environment information, but the example embodiments are not limited thereto, and for example, one or more of the operations may be performed simultaneously, may be performed in a different order than shown, may be omitted, additional operations may be performed, etc. Typically, the unused state may be or correspond to a low illuminance environment with little external light, such as when the electronic device is in a pocket, bag, or at night, and the reference image obtained in the low illuminance environment may best represent information about the internal structure of the panel, which is the interference component, etc. Operations S100, S200, S300 and S400 in FIG. 7 may be substantially the same as described with reference to FIG. 1, but are not limited thereto.

When the display panel or the electronic device does not have the unused state, e.g., is not in the unused state and/or is currently being used, etc., (operation S600: NO), the process may be terminated without obtaining the first reference image, but the example embodiments are not limited thereto.

FIGS. 8A, 8B, 8C, 8D, 8E, 8F and 8G are diagrams for describing an operation of checking whether a display panel and/or an electronic device has an unused state in FIG. 7 according to some example embodiments. In FIGS. 8A, 8B, 8C, 8D, 8E, 8F and 8G, a horizontal axis represents time, and a vertical axis represents an output value of an acceleration sensor.

Figure 8A:
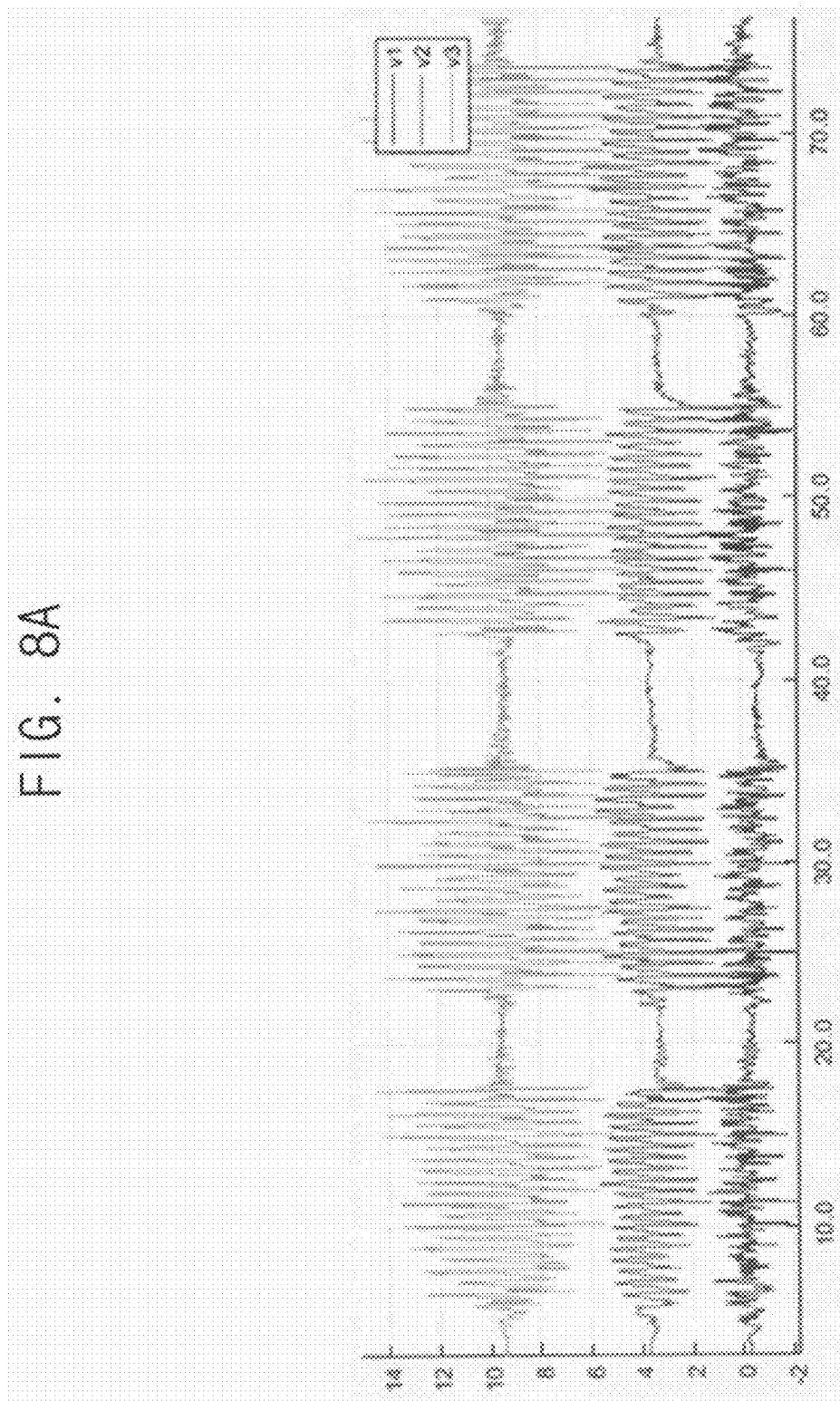
FIGS. 8A, 8B, 8C, 8D, 8E, 8F and 8G are diagrams for describing an operation of checking whether a display panel or an electronic device has an unused state in FIG. 7 according to at least one example embodiment.
Figure 8B:
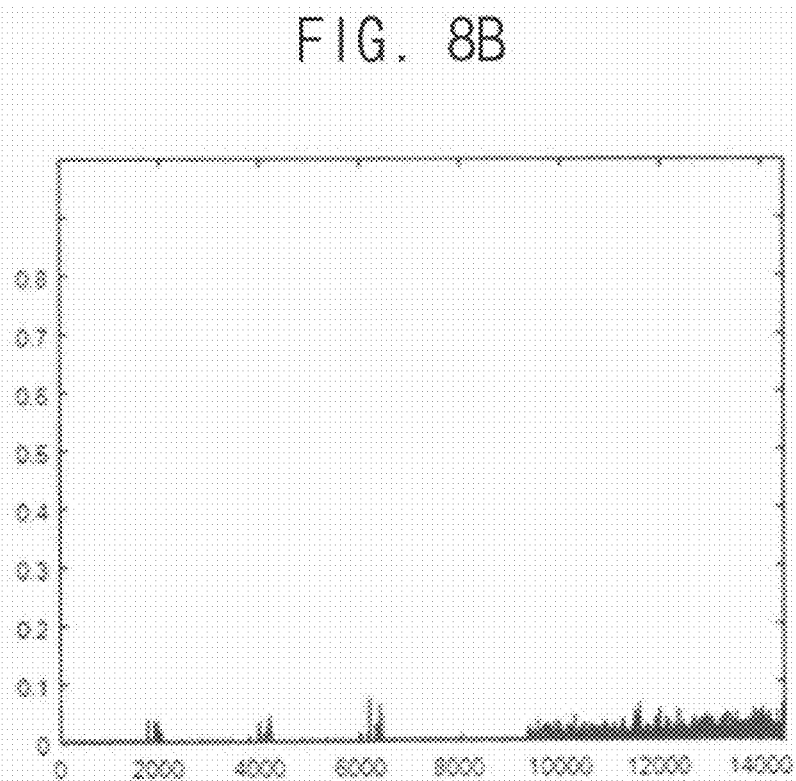
Figure 8C:
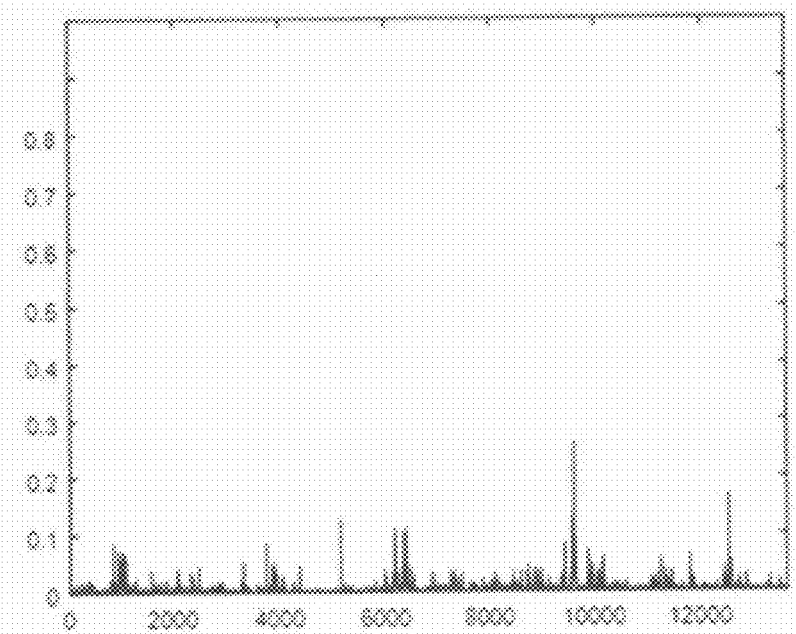
Figure 8D:
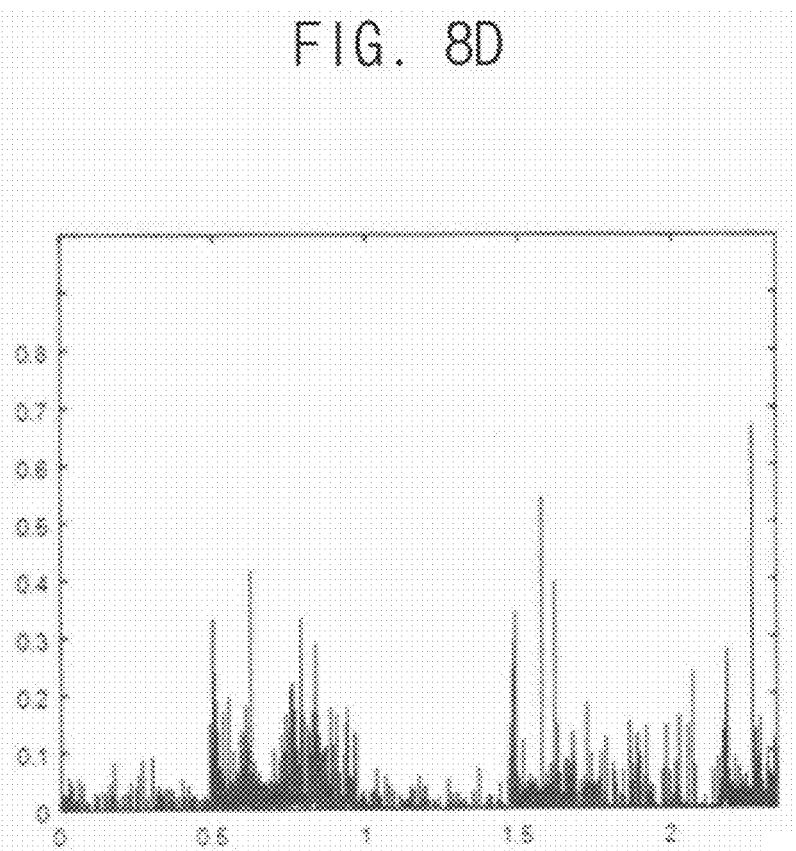
Figure 8E:
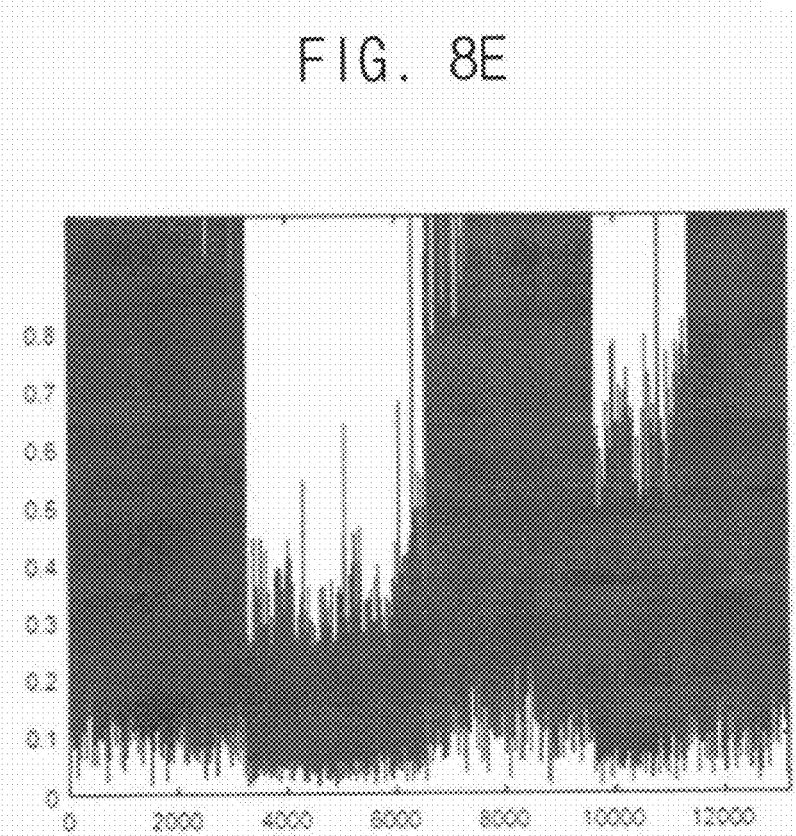
Figure 8F:
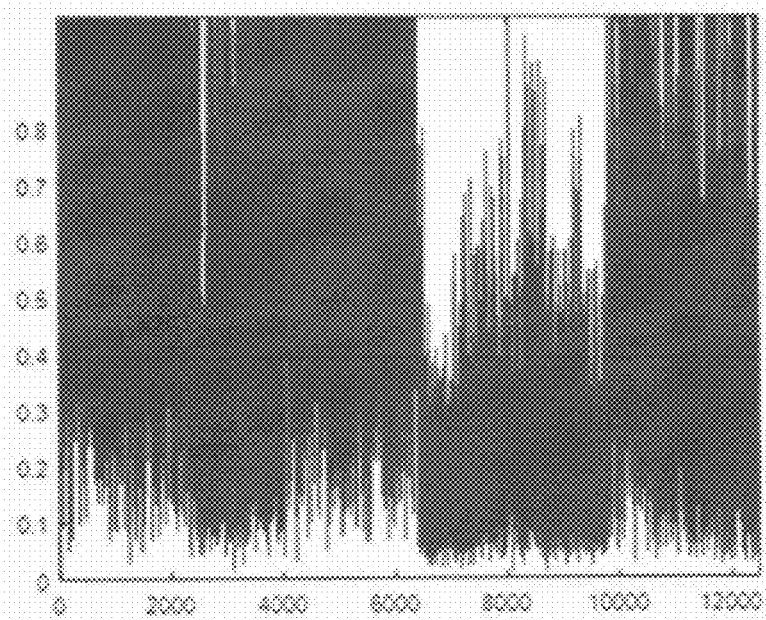
Figure 8G:
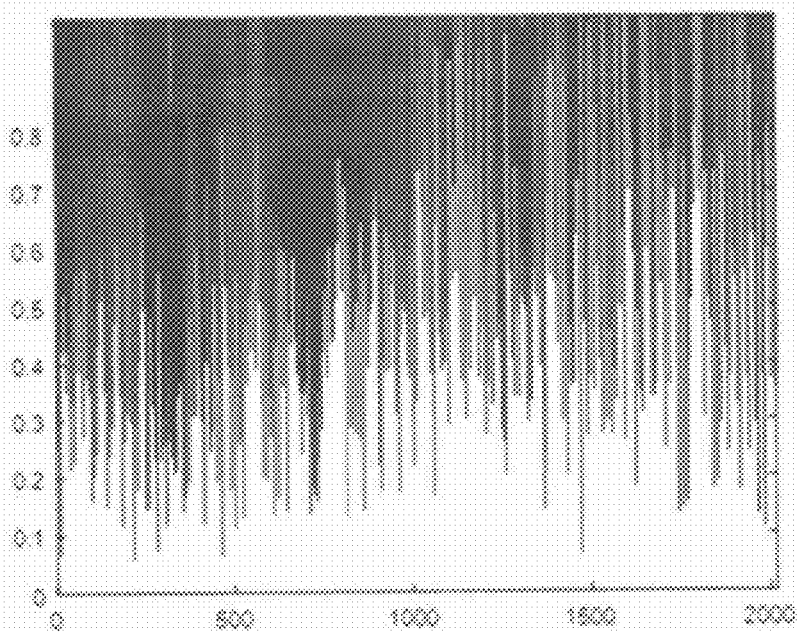

FIG. 8A illustrates continuous and/or successive data obtained from a three-axis acceleration sensor. FIGS. 8B, 8C, 8D, 8E, 8F and 8G illustrate results of determining a current state of the electronic device based on the data in FIG. 8A according to some example embodiments. FIG. 8B illustrates that the electronic device is in a static state (e.g., the electronic device is immobile and/or not moving, etc.). FIG. 8C illustrates a state in which a user of the electronic device is sitting. FIG. 8D illustrates a state in which the user holds the electronic device in his or her hand. FIG. 8E illustrates a state in which the user of the electronic device is walking. FIG. 8F illustrates a state in which the user of the electronic device goes up and/or down a flight of stairs. FIG. 8G illustrates a state in which the user of the electronic device is running.

As illustrated in FIGS. 8A, 8B, 8C, 8D, 8E, 8F and 8G, a state in which the user is not using the electronic device may be determined as the unused state by synthetically and/or systematically analyzing the data from the acceleration sensor obtained according to the movement of the electronic device, and thus an intermittent and/or periodic photographing of the reference image may be performed without inconvenience to the user in the unused state. In other words, the reference image may be obtained by the electronic device when the electronic device is not in use by the user, etc. In some example embodiments, an additional sensor such as an optical device may be used to improve the accuracy of the determination, if necessary.

FIG. 9 is a flowchart illustrating another example of the method of obtaining the reference image of FIG. 1 according to at least one example embodiment. The descriptions of repeated elements with FIG. 1 will be omitted.

Referring to FIG. 9, in the method of obtaining the reference image for the optical object recognition according to at least one example embodiment, operations S100, S200, S300 and S400 in FIG. 9 may be substantially the same as described with reference to FIG. 1, but the example embodiments are not limited thereto.

According to at least one example embodiment, the electronic device may check whether the first reference image obtained in operation S300 is a contaminated image (operation S700). For example, the contaminated image may be an image including an object (e.g., a unique pattern of a bag when the electronic device is in the bag, etc.) other than the first object, which is a target object of the optical object recognition, or may be an image including information of an external light source other than the light source of the display device, etc.

When the first reference image is not the contaminated image (operation S700: NO), operation S400 may be performed to store the first reference image and the first environment information. When the first reference image is the contaminated image (operation S700: YES), the first reference image may be discarded, deleted, or scrapped without storing the first reference image in memory (operation S750), and the first environment information may also be discarded. For example, as will be described later, the image including the object other than the first object may be removed by analyzing a frequency component, and the image including the information of the external light source may be removed by analyzing a histogram, etc., but the example embodiments are not limited thereto.

In some example embodiments, the method of obtaining the reference image for the optical object recognition may be implemented by combining at least two of the examples of FIGS. 6, 7 and 9, but the example embodiments are not limited thereto.

FIG. 10 is a flowchart illustrating an example of checking whether a first reference image is a contaminated image in FIG. 9 according to at least one example embodiment.

Referring to FIGS. 9 and 10, when the electronic device checks whether the first reference image is the contaminated image (operation S700), a first value may be obtained by performing a spatial signal processing (or an object detection processing in a spatial domain) on the first reference image (operation S710), but the example embodiments are not limited thereto. For example, the spatial signal processing may represent a scheme or method of directly using a pixel value (e.g., pixel color value) or a grayscale value, etc. For example, the first value may be a statistical value (e.g., a variance) based on illuminance. However, the example embodiments are not limited thereto, and at least one of various techniques may be used.

The electronic device may determine whether the first reference image is the contaminated image based on the first value and a desired and/or predetermined first threshold value (e.g., a spatial domain threshold value, a first spatial domain threshold value, etc.). For example, when the first value is less than or equal to the first threshold value (operation S720: NO), the electronic device may determine that the first reference image is a normal reference image (operation S730), however the example embodiments are not limited thereto. When the first value is greater than the first threshold value (operation S720: YES), the electronic device may determine that the first reference image is the contaminated image (operation S740), etc. For example, the contaminated image may be the image including the information of the external light source, and the image including the information of the external light source may be removed by analyzing a histogram, etc. Typically, an image contaminated by an external light source may have a relatively high pixel value compared to a pixel value of which the light source of the display device is reflected by the target object, and there may be a relatively large number of pixels having pixel values greater than or equal to a desired and/or predetermined threshold value in a histogram of the obtained image, and thus the electronic device may determine that the obtained image is contaminated by the external light source when a plurality of pixels having pixel values greater than or equal to the threshold value are detected, but the example embodiments are not limited thereto.

FIGS. 11A, 11B, 11C, 11D and 12 are diagrams for describing an operation of checking whether the first reference image is the contaminated image of FIG. 10 according to at least one example embodiment.

Figure 11A:
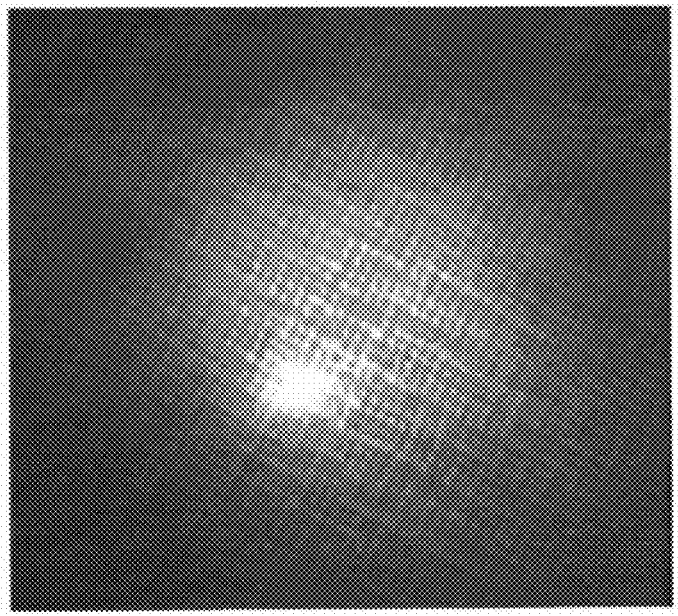
Figure 11B:
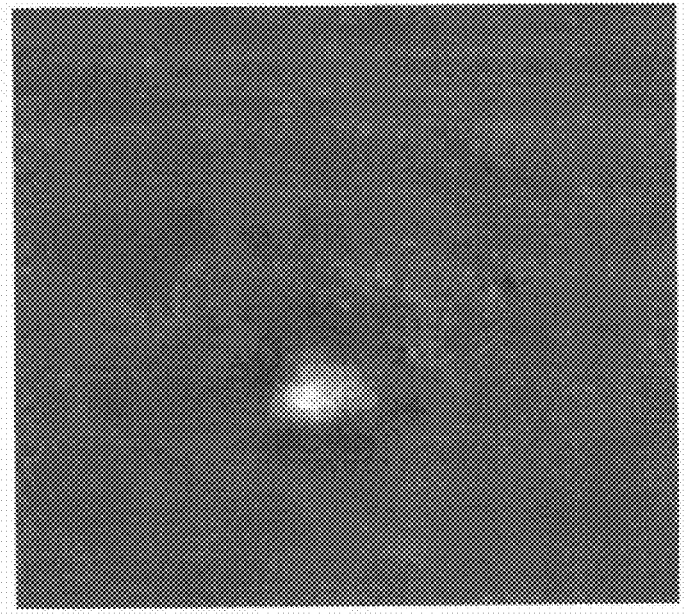

Referring to FIGS. 11A and 11B, FIG. 11A illustrates a reference image including both noise and interference, and FIG. 11B illustrates an image representing a result of applying differential and signal processing filters on the images of FIG. 11A. It may be seen that both the images of FIGS. 11A and 11B are images contaminated by the external light source because the external light source is clearly captured and observed in the images.

Figure 11C:
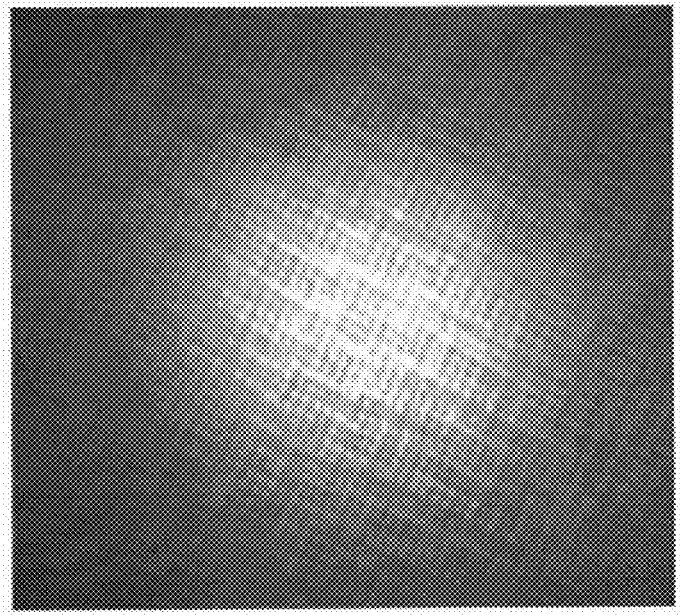
Figure 11D:
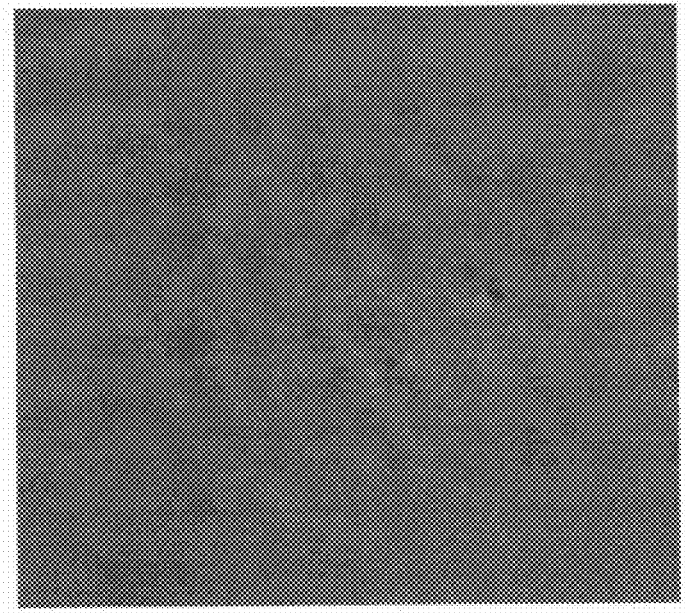

Referring to FIGS. 11C and 11D, FIG. 11C illustrates a reference image including both noise and interference, and FIG. 11B illustrates an image representing a result of applying differential and signal processing filters on the images of FIG. 11C. Unlike the images of FIGS. 11A and 11B, the external light source may be blocked and may not be observed in the images of FIGS. 11C and 11D, and thus it may be seen that only noise and interference are well represented in the reference images of FIG. 11C.

Referring to FIG. 12, FIG. 12 illustrates a result of performing operation S710 in FIG. 10 on the images of FIGS. 11A and 11C according to some example embodiments. In the graph illustrated in FIG. 12, a horizontal axis FRAME represents the frame number of images, and a vertical axis SV represents the first value (e.g., a variance based on illuminance). A first frame image F1 and a second frame image F2 in FIG. 12 represent the image of FIG. 11A and the image of FIG. 11C, respectively.

As illustrated in FIG. 12, a value SV11 obtained by performing the spatial signal processing on the first frame image F1 may be greater than a first threshold value TH1, and thus the image of FIG. 11A may be determined as the contaminated image. A value SV12 obtained by performing the spatial signal processing on the second frame image F2 may be less than the first threshold value TH1, and thus the image of FIG. 11C may be determined as the normal reference image.

FIG. 13 is a flowchart illustrating another example of checking whether the first reference image is the contaminated image in FIG. 9 according to at least one example embodiment.

Referring to FIGS. 9 and 13, when checking whether the first reference image is the contaminated image (operation S700), a second value may be obtained by the electronic device by performing a frequency signal processing (or an object detection processing in a frequency domain) on a first reference image (operation S715). For example, the frequency signal processing may represent a scheme or method of transforming a pixel value (e.g., pixel color value) and/or a grayscale value into a frequency value (or bands) and using the transformed frequency value, such as a wavelet transform or a Fourier transform, or the like. For example, the second value may be a result of the Fourier transform, etc. However, the example embodiments are not limited thereto, and at least one of various techniques may be used.

The electronic device may determine whether the first reference image is the contaminated image based on the second value and a desired and/or predetermined second threshold value (e.g., a frequency domain threshold value, a second frequency domain threshold value, etc.). For example, when the second value is less than or equal to the second threshold value (operation S725: NO), it may be determined that the first reference image is a normal reference image (operation S730), but the example embodiments are not limited thereto. When the second value is greater than the second threshold value (operation S725: YES), the electronic device may determine that the first reference image is the contaminated image (operation S740), etc. For example, the second threshold value may be different from the first threshold value, but is not limited thereto. For example, the contaminated image may be the image including the object other than the first object (e.g., the target object), and the image including the object other than the first object may be removed by analyzing a frequency component. Typically, when a signal strength in a frequency band is greater than or equal to a desired and/or predetermined threshold value, the electronic device may determine that the obtained image is an image including an object, and such image may include a part in which an object of the user is actually measured and a component other than the object signal remains in the form of an object.

FIG. 14 is a diagram for describing an operation of checking whether the first reference image is the contaminated image of FIG. 13 according to at least one example embodiment.

Referring to FIG. 14, FIG. 14 illustrates a result of performing operation S715 in FIG. 13 on the images of FIGS. 11A and 11C. In the graph illustrated in FIG. 14, a horizontal axis FRAME represents the frame number of a plurality of images, and a vertical axis FTV represents the second value (e.g., a result of the Fourier transform).

As illustrated in FIG. 14, a value FTV11 obtained by performing the frequency signal processing on the first frame image F1 may be greater than a second threshold value TH2, and thus the image of FIG. 11A may be determined by the electronic device as the contaminated image. A value FTV12 obtained by performing the frequency signal processing on the second frame image F2 may be less than the second threshold value TH2, and thus the image of FIG. 11C may be determined by the electronic device as the normal reference image.

Although the examples of FIGS. 10 and 13 are described as separate examples, the example embodiments are not limited thereto, and the method of obtaining the reference image for the optical object recognition according to at least one example embodiment may be implemented by combining both the examples of FIGS. 10 and 13. For example, the first value may be obtained by performing the spatial signal processing on the first reference image, the second value may be obtained by performing the frequency signal processing on the first reference image, and the electronic device may determine whether the first reference image is the contaminated image based on all of the first value, the first threshold value, the second value and the second threshold value, etc. For example, when the first value is greater than the first threshold value or when the second value is greater than the second threshold value, the first reference image may be determined as the contaminated image. When the first value is less than or equal to the first threshold value and when the second value is less than or equal to the second threshold value, the first reference image may be determined as a normal reference image.

In some example embodiments, when obtaining the reference image, the reference image may be updated by performing signal processing in the form of a finite impulse response (FIR) or an infinite impulse response (IIR) rather than using only one image. In the FIR example, one object-free image with high quality (or high performance) may be obtained by storing and using a specific number of object-free images. In the IIR example, one object-free image with high quality may be updated and used whenever a new object-free image is input. In a case of the FIR example, object-free images in a specific environment may be collected to obtain an image improved and/or optimized for the specific environment. In a case of the IIR example, updates may be performed slowly but may be applied extensively using accumulated information.

Figure 15:
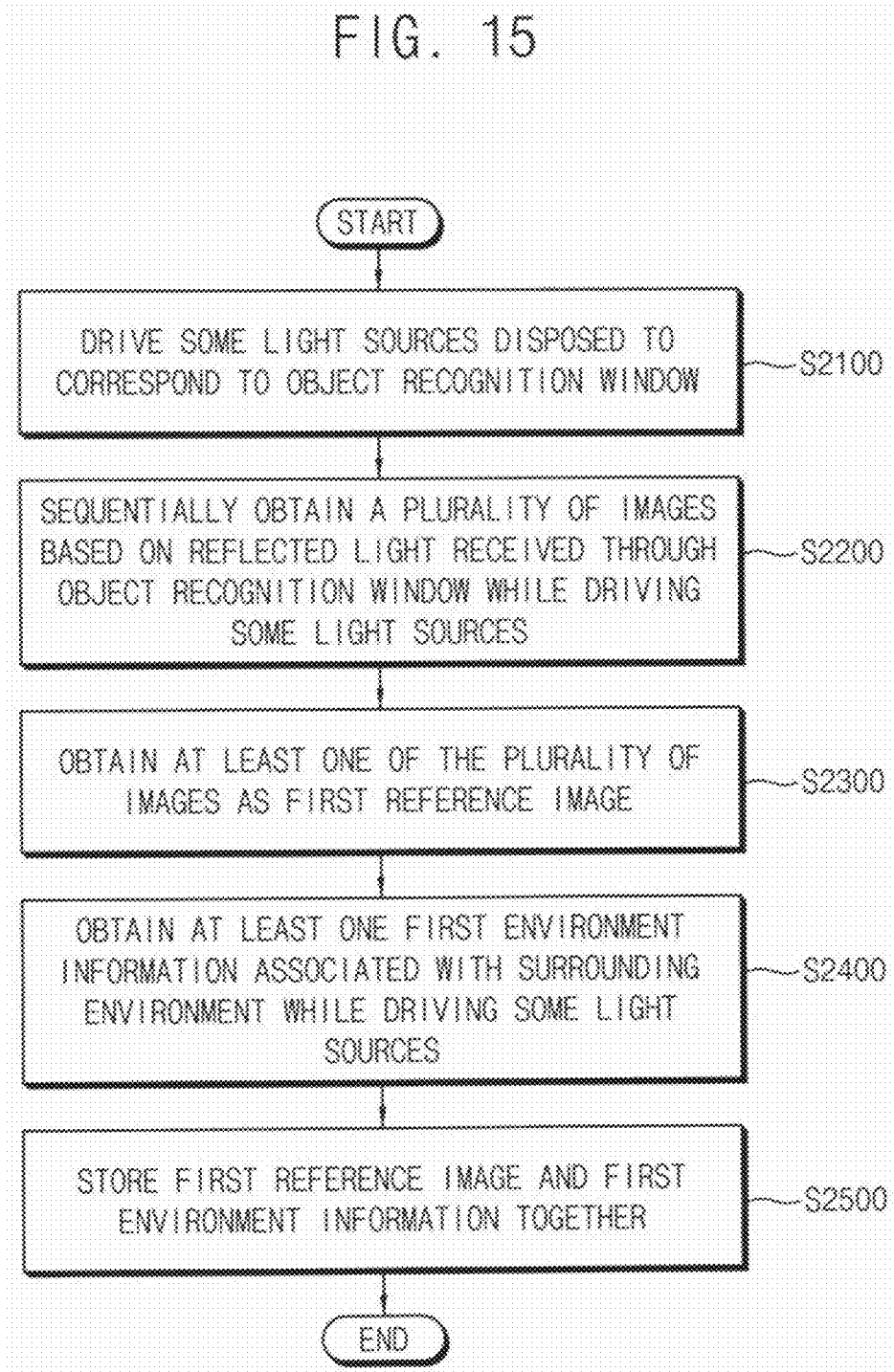
FIG. 15 is a flowchart illustrating a method of obtaining a reference image for optical object recognition according to some example embodiments.

FIG. 15 is a flowchart illustrating a method of obtaining a reference image for optical object recognition according to some example embodiments. The descriptions repeated with FIG. 1 will be omitted.

Referring to FIG. 15, in a method of obtaining a reference image for optical object recognition according to example embodiments, operation S2100 may be substantially the same as operation S100 in FIG. 1.

While the some light sources are driven, a plurality of images are sequentially, periodically, and/or continuously obtained based on reflected light received by an object recognition sensor through the object recognition window (operation S2200). Unlike the example of FIG. 1 in which only one image is obtained, the object recognition sensor may sequentially, periodically, and/or continuously obtain several images corresponding to the object recognition window and/or the any object based on the reflected light in an example of FIG. 15.

At least one of the plurality of images is obtained as a first reference image for optical object recognition associated with a first object (operation S2300). While the some light sources are driven, at least one first environment information is obtained using at least one environmental sensor (operation S2400). The first environment information is associated with a surrounding environment in which the some light sources are driven (e.g., the environment surrounding the electronic device and/or the display panel, etc.). The first reference image and the first environment information for the first reference image are stored together (operation S2500). Thus, a desired, a best, a most suitable and/or an optimal reference image may be selected from the plurality of images. Operations S2400 and S2500 may be substantially the same as operations S300 and S400 in FIG. 1, respectively.

In some example embodiments, the first reference image may be an image which does not include the first object. In addition, the plurality of images may include a first image which includes the first object, and the first reference image may be an image obtained immediately before or immediately after the first image among the plurality of images that are sequentially, periodically, and/or continuously obtained. Typically, the most suitable reference image obtained in the same environment as the first image may be an image captured immediately before or after the first image is captured, but the example embodiments are not limited thereto.

In some example embodiments, at least one of operation S500 in FIG. 6, operation S600 in FIG. 7 and operation S700 in FIG. 9 may be added to the example of FIG. 15, but the example embodiments are not limited thereto.

In the method of obtaining the reference image for the optical object recognition according to at least one example embodiment, an object-free image or an image without an object (e.g., the reference image, the calibration image, etc.) used to perform the optical object recognition that obtains only pure information associated with the object by subtracting the object-free image from an image including the object may be efficiently obtained. In addition, the object-free image and the image including the object may be selected from the plurality of images sequentially obtained in the same environment. Accordingly, the robust object image restoration may be performed or the pure information associated with the object may be robustly restored based on the object-free image, and the efficient optical object recognition may be supported.

Figure 16:
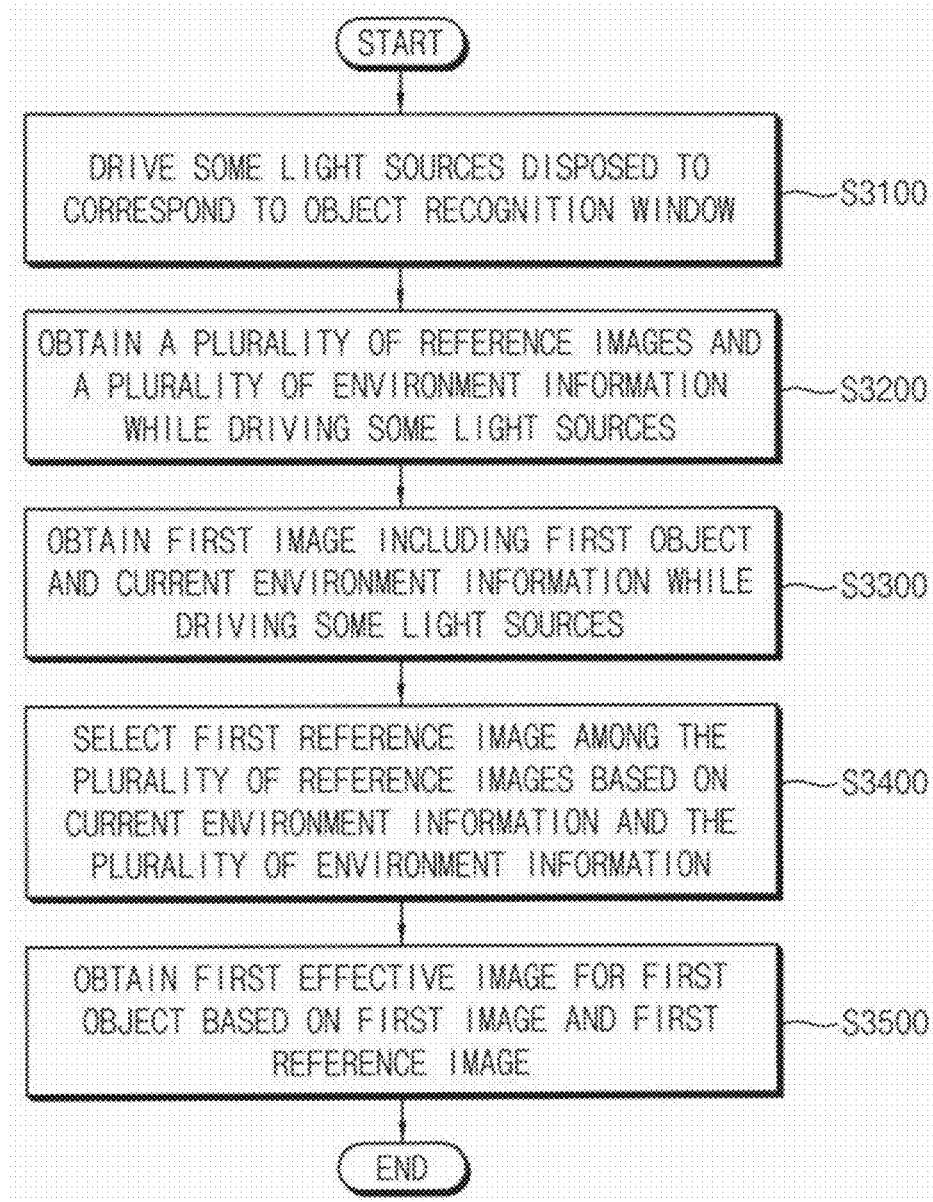
FIG. 16 is a flowchart illustrating a method of performing optical object recognition according to some example embodiments.

FIG. 16 is a flowchart illustrating a method of performing optical object recognition according to some example embodiments. The descriptions of elements repeated with FIG. 1 will be omitted.

Referring to FIG. 16, in a method of performing optical object recognition according to some example embodiments, operation S3100 may be substantially the same as operation S100 in FIG. 1.

While some light sources are driven, a plurality of reference images and a plurality of environment information corresponding to the plurality of reference images are obtained using the object recognition sensor and the at least one environmental sensor, respectively (operation S3200). Each of the plurality of reference images is an image which does not include a first object. Operation S3200 may include operations S200, S300 and S400 in FIG. 1. According to some example embodiments, all of the plurality of reference images may be obtained under different environment conditions or some of the plurality of reference images may be obtained under the same environment condition, and/or the reference images obtained under the same environment condition may be combined and updated into one reference image by performing the signal processing in the form of the FIR or the IIR, etc.

While some light sources are driven, a first image including the first object and current environment information corresponding to the first image are obtained using the object recognition sensor and the at least one environmental sensor, respectively (operation S3300). A first reference image among the plurality of reference images is selected based on the current environment information and the plurality of environment information (operation S3400). A first effective image for the first object is obtained based on the first image and the first reference image (operation S3500). One of the plurality of reference images that is desired, the best, the most suitable, etc., for the first image may be selected as the first reference image, and thus efficient optical object recognition may be performed.

Figure 17:
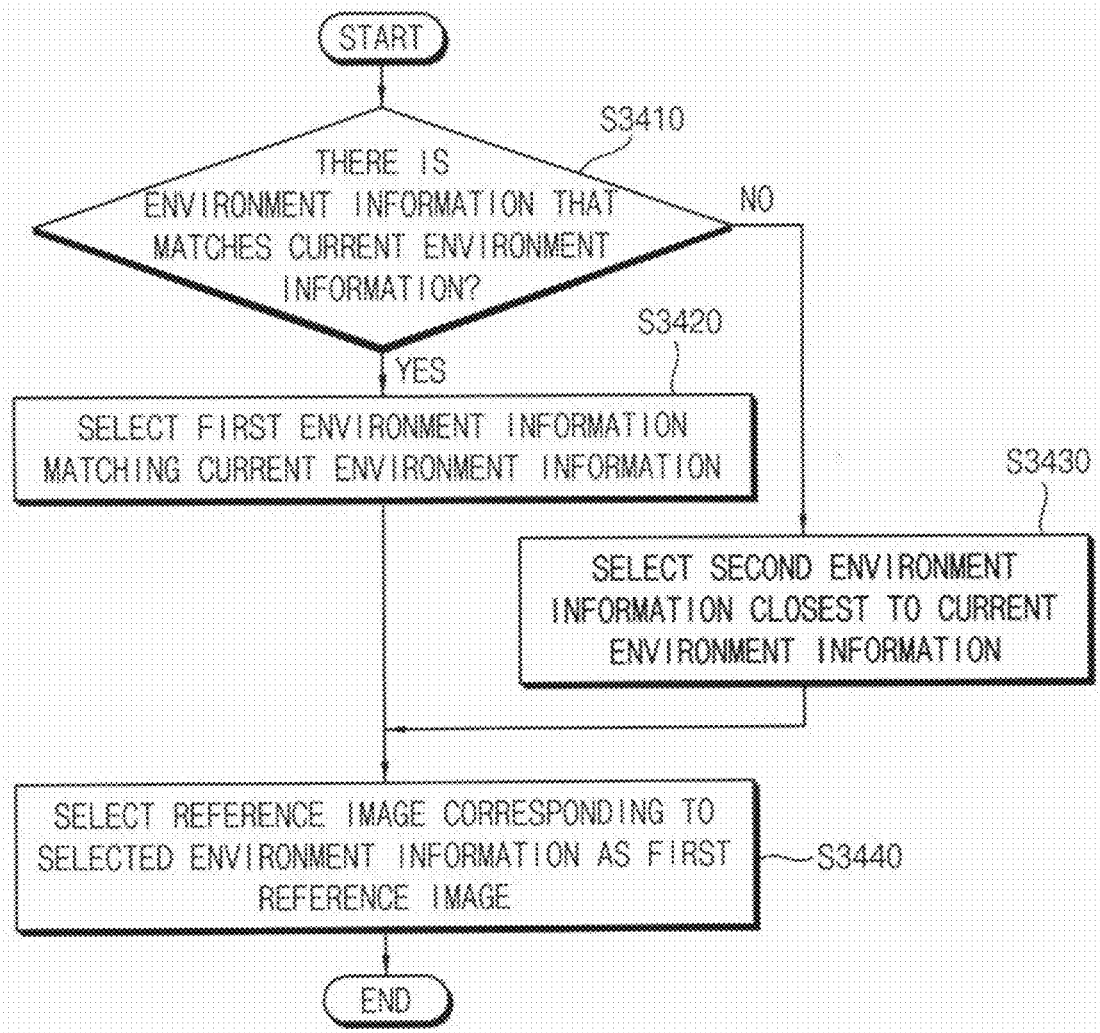
FIG. 17 is a flowchart illustrating an example of selecting a first reference image in FIG. 16 according to at least one example embodiment.

FIG. 17 is a flowchart illustrating an example of selecting a first reference image in FIG. 16 according to at least one example embodiment.

Referring to FIGS. 16 and 17, when selecting the first reference image (operation S3400), the electronic device may check whether environmental information matching the current environment information exists among the previously obtained plurality of environmental information (operation S3410).

When first environment information matching the current environment information exists (operation S3410: YES), the electronic device may select the first environment information (operation S3420). When environmental information exactly matching the current environment information does not exist among the plurality of previously obtained environmental information (operation S3410: NO), second environment information closest to the current environment information among the plurality of environment information may be selected by the electronic device (operation S3430). A reference image corresponding to the selected environment information may be selected as the first reference image (operation S3440).

Although FIG. 16 illustrates an example including the plurality of reference images, the example embodiments are not limited thereto. For example, the example embodiments may also be applied to an example including only one reference image, and operation S3400 in FIG. 16 may be omitted, etc.

Figure 18:
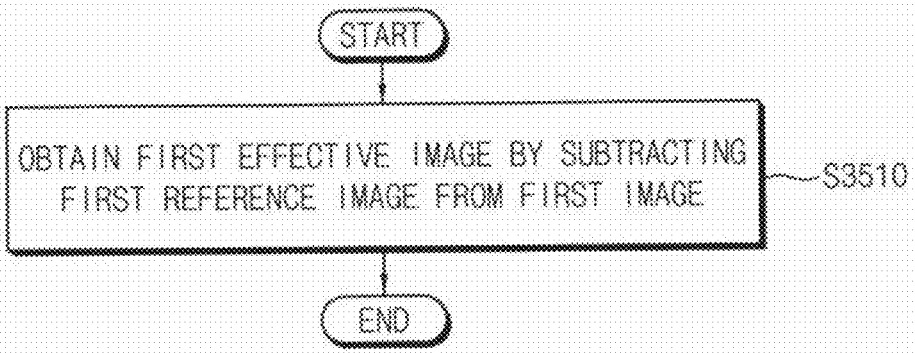
FIG. 18 is a flowchart illustrating an example of obtaining a first effective image in FIG. 16 according to at least one example embodiment.

FIG. 18 is a flowchart illustrating an example of obtaining a first effective image in FIG. 16 according to at least one example embodiment.

Referring to FIGS. 16 and 18, when obtaining the first effective image (operation S3500), the electronic device may obtain the first effective image by subtracting the first reference image from the first image (operation S3510).

Figure 19A:
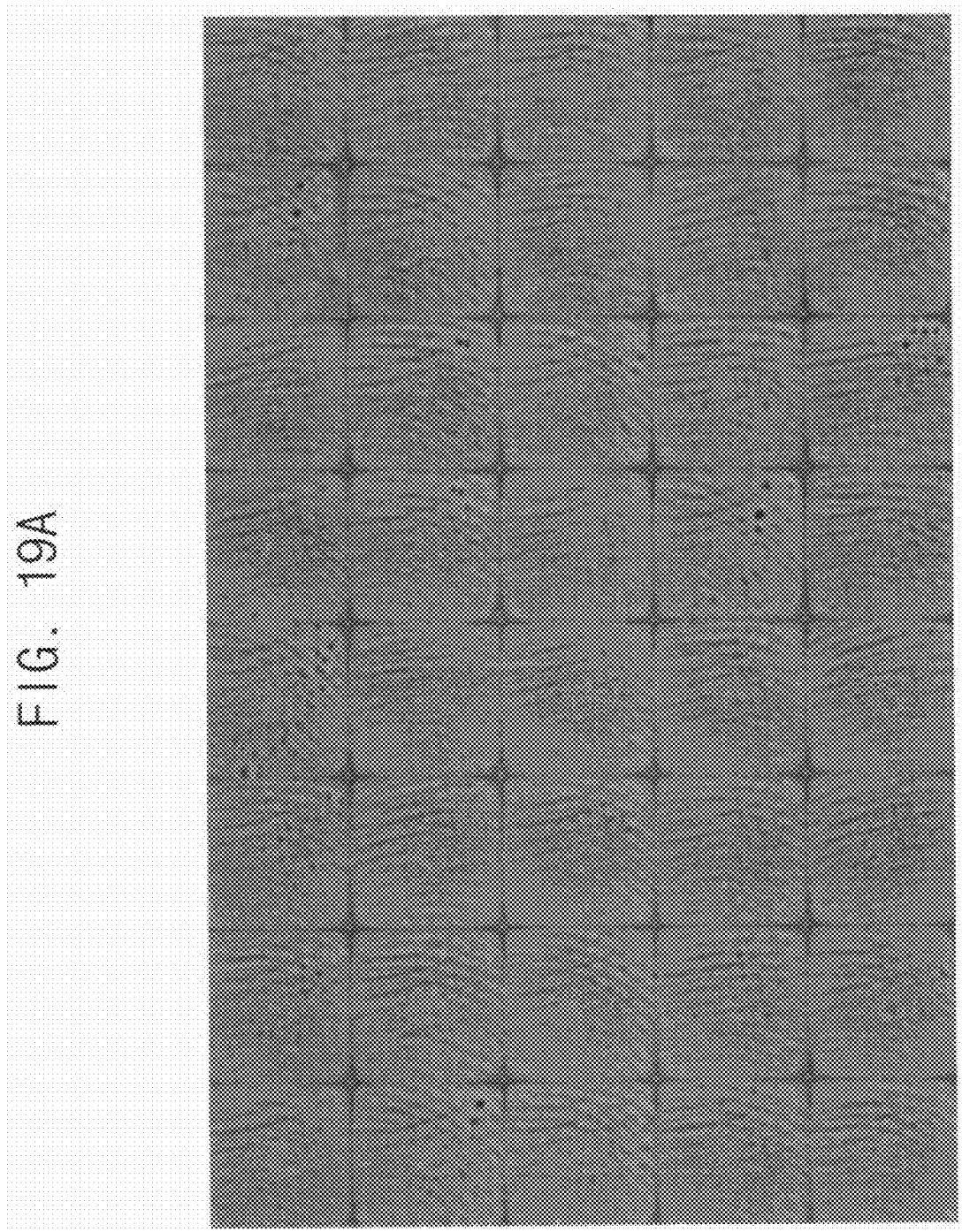
FIGS. 19A and 19B are diagrams for describing a method of performing optical object recognition according to some example embodiments.
Figure 19B:
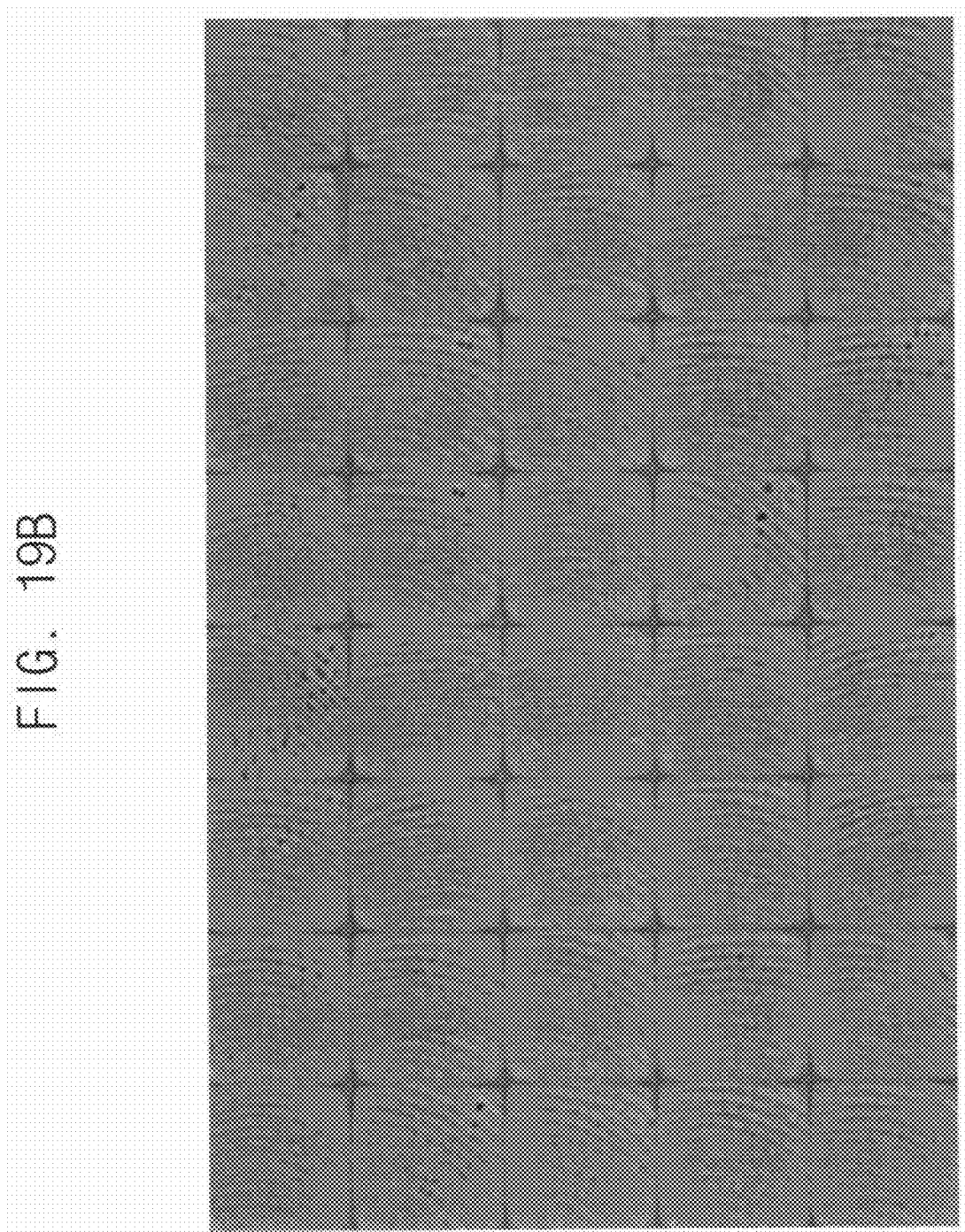

FIGS. 19A and 19B are diagrams for describing a method of performing optical object recognition according to some example embodiments.

Referring to FIGS. 19A and 19B, images applying the differential and signal processing filters are illustrated. FIG. 19A illustrates a result of using a reference image obtained in a different environment from an object image (e.g., an environment in which a temperature difference is relatively large, etc.). FIG. 19B illustrates a result of using a reference image obtained in the same environment as an object image according to some example embodiments.

While the interference grid patterns is severe in FIG. 19A, the interference and noise are removed in FIG. 19B, so that only the fingerprint clearly remains. The increased accuracy of the obtained image has an effect of distinguishing and/or improving the ridges and valleys of the fingerprint for use in fingerprint recognition. In FIG. 19A, the interference and/or noise, etc., in the form of multiple lines are generated regardless of the quality of the fingerprint, and intersections between the lines and the fingerprint may be incorrectly recognized as a characteristic of the fingerprint, thereby significantly degrading and/or decreasing the performance of fingerprint matching and/or decreasing the accuracy of the fingerprint matching, and may lead to confusion with other people's fingerprints, etc. In contrast, in FIG. 19B, a superior fingerprint image and/or improved fingerprint image adapted to changes in environmental may be obtained.

As will be appreciated by those skilled in the art, various example embodiments of the inventive concepts may be embodied as a system, method, computer program product, and/or a computer program product embodied in one or more non-transitory computer readable medium(s) having computer readable program code embodied thereon. The computer readable program code may be provided to a processor of a general purpose computer, special purpose computer, or other programmable data processing apparatus. The computer readable medium may be a non-transitory computer readable storage medium. The non-transitory computer readable storage medium may be any tangible medium that can contain or store a program for use by or in connection with an instruction execution system, apparatus, or device, such as an optical disk, a hard drive, a solid state drive, RAM, ROM, etc.

FIG. 20 is a block diagram illustrating an electronic device according to some example embodiments.

Referring to FIG. 20, an electronic device 1000 may include processing circuitry, the processing circuitry including at least one processor 1010, a memory device 1020, at least one object recognition sensor 1030, etc., and the electronic device 100 may further include at least one input/output (I/O) device 1040, a power supply 1050, and/or a display device 1060, etc., but the example embodiments are not limited thereto. The electronic device 100 may further include a plurality of ports for communicating a video card, a sound card, a memory card, a universal serial bus (USB) device, other electronic devices, etc.

The processor 1010 controls operations of the electronic device 1000. The processor 1010 may execute at least one operating system and at least one application to provide an internet browser, games, videos, or the like. The memory device 1020 may store data for the operations of the electronic device 1000. The I/O device 1040 may include an input device such as a keyboard, a keypad, a mouse, a touchpad, a touch-screen, a remote controller, etc., and an output device such as a printer, a speaker, a display, etc. The power supply 1050 may provide a power for the operations of the electronic device 1000.

The display device 1060 includes a display panel and/or a touch sensor panel, etc., but is not limited thereto. The display panel, the touch sensor panel, the object recognition sensor 1030, the processor 1010 and the memory device 1020 in FIG. 17 may correspond to the display panel 111, the touch sensor panel 115, the object recognition sensor 130, the processor 140 and the memory 150 in FIG. 4, respectively, and may perform the method of obtaining the reference image according to at least one example embodiment, and the method of performing the optical object recognition according to at least one example embodiment.

Various example embodiments of the inventive concepts may be applied to various electronic devices and systems that include display panels, object recognition sensors, and perform the optical object recognition. For example, at least one example embodiment of the inventive concepts may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of various example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of obtaining a reference image for optical object recognition, the method comprising:
    driving a subset of light sources of a plurality of light sources included in at least one display panel, the subset of light sources corresponding to an object recognition window which is a partial region of the display panel;
    receiving, using an object recognition sensor, light reflected through the object recognition window, the light emitted by the subset of light sources;
    obtaining a plurality of reference images based on the reflected light while the subset of light sources are driven, the plurality of reference images including a first reference image;
    obtaining a plurality of environment information corresponding to the plurality of reference images using at least one environmental sensor while the subset of light sources are driven, the plurality of environment information associated with a surrounding environment during a time when the corresponding plurality of reference images were obtained, the plurality of environment information including a first environment information corresponding to the first reference image;
    storing the first reference image and the first environment information together;
    obtaining a first target image associated with a first target object based on the reflected light while the subset of light sources are driven, the first target object being a target of the optical object recognition; and
    obtaining a first effective image for optical object recognition associated with the first target object based on the first target image, the first reference image, and the first environment information.

2. The method of claim 1, wherein the first reference image is an image which does not include the first target object.

3. The method of claim 1, wherein the first environment information includes at least one of temperature information, humidity information, pressure information, motion information, temporal information, spatial information, illumination information, acceleration information, vibration information, external force information, shock information, or any combinations thereof.

4. The method of claim 1, further comprising:
    sensing, by a touch sensor panel, a touch input of a user; and
    in response to the touch input being sensed,
        the subset of light sources are driven, and
        the first reference image and the first environment information are obtained and stored.

5. The method of claim 1, further comprising:
    determining whether the display panel or an electronic device including the display panel are in an inactive state; and
    in response to the display panel or the electronic device being in the inactive state, the subset of light sources are driven, and the first reference image and the first environment information are obtained and stored.

6. The method of claim 5, wherein the determining whether the display panel or the electronic device are in the inactive state includes:
    determining whether the plurality of light sources included in the display panel are driven; and
    determining whether the display panel or the electronic device are in the inactive state based on results of the determining whether the plurality of light sources included in the display panel are driven.

7. The method of claim 5, wherein:
    the at least one environmental sensor includes an acceleration sensor; and
    the determining whether the display panel or the electronic device is in the inactive state is based on acceleration information obtained by the acceleration sensor.

8. The method of claim 1, further comprising:
    determining whether the first reference image is a contaminated image; and
    in response to the first reference image being the contaminated image, discarding the first reference image without storing the first reference image.

9. The method of claim 8, wherein the determining whether the first reference image is the contaminated image includes:
    obtaining a first value by performing spatial signal processing on the first reference image; and
    determining whether the first reference image is the contaminated image based on the first value and a desired first threshold value.

10. The method of claim 9, wherein the determining whether the first reference image is the contaminated image includes in response to determining the first reference image is the contaminated image in response to the first value being greater than the first threshold value.

11. The method of claim 8, wherein the determining whether the first reference image is the contaminated image includes:
    obtaining a second value by performing frequency signal processing on the first reference image; and
    determining whether the first reference image is the contaminated image based on the second value and a desired second threshold value.

12. The method of claim 11, wherein the determining whether the first reference image is the contaminated image includes determining the first reference image is the contaminated image in response to the second value being greater than the second threshold value.

13. The method of claim 8, wherein the contaminated image is an image including an object other than the first target object, or an image including information of an external light source other than the plurality of light sources included in the display panel.

14. The method of claim 1, further comprising:
    sequentially obtaining the plurality of reference images based on the reflected light received by the object recognition sensor through the object recognition window while the subset of light sources are driven; and
    selecting at least one image of the plurality of images as the first reference image.

15. The method of claim 1, wherein:
    the display panel includes a first surface on which an image is displayed and a second surface opposite to the first surface; and
    the object recognition sensor is under the second surface of the display panel.

16. A method of performing optical object recognition, the method comprising:
    driving a subset of light sources of a plurality of light sources included in a display panel, the subset of light sources corresponding to an object recognition window which is a partial region of the display panel;
    obtaining, using an object recognition sensor, a plurality of reference images while the subset of light sources are driven, each of the plurality of reference images being an image which does not include a first target object;

obtaining, using at least one environmental sensor, a plurality of environment information corresponding to the plurality of reference images while the subset of light sources are driven;

obtaining, using the object recognition sensor, a first target image including the first target object while the subset of light sources are driven;

obtaining, using the environmental sensor, current environment information corresponding to the first target image while the subset of light sources are driven;

selecting a first reference image among the plurality of reference images based on the current environment information and the plurality of environment information; and obtaining a first effective image for the first target object based on the first target image and the first reference image.

17. The method of claim 16, wherein the selecting the first reference image includes:

selecting first environment information matching the current environment information among the plurality of environment information; and selecting the first reference image corresponding to the first environment information.

18. The method of claim 16, wherein the selecting the first reference image includes:

determining whether an environment information of the plurality of environment information matches the current environment information;

in response to no environment information matching the current environment information, selecting second environment information closest to the current environment information among the plurality of environment information; and selecting a second reference image corresponding to the selected second environment information as the first reference image.

19. The method of claim 16, wherein the obtaining the first effective image includes:

obtaining the first effective image by subtracting the first reference image from the first target image.

20. A method of obtaining a reference image for optical object recognition, the method comprising:

driving a subset of light sources of a plurality of light sources included in a display panel, the subset of light sources corresponding to an object recognition window which is a partial region of the display panel;

receiving, using an object recognition sensor, light reflected through the object recognition window, the light emitted by the subset of light sources;

sequentially obtaining a plurality of images based on the reflected light while the subset of light sources are driven;

obtaining at least one of the plurality of images as a first reference image, the first reference image being an image which does not include a first target object, the obtaining the at least one of the plurality of images as the first reference image including, obtaining a plurality of first values by performing spatial signal processing on the plurality of images, obtaining a plurality of second values by performing frequency signal processing on the plurality of images, and selecting at least one image among the plurality of images as the first reference image based on a corresponding first value, a corresponding second value, a spatial domain threshold value, and a frequency domain threshold value;

obtaining a first target image associated with the first target object based on the reflected light while the subset of light sources are driven;

obtaining at least one first environment information using at least one environmental sensor while the subset of light sources are driven, the first environment information being associated with a surrounding environment in which the subset of light sources are driven;

storing the first reference image and the first environment information for the first reference image together; and obtaining a first effective image for optical object recognition associated with the first target object based on the first target image and the first reference image.

* * * * *